(12) United States Patent
Ohtani et al.

(10) Patent No.: US 6,317,399 B1
(45) Date of Patent: Nov. 13, 2001

(54) DISK DRIVE DEVICE AND METHOD OF SETTING ROTATIONAL SPEED THEREOF

(75) Inventors: Hisao Ohtani; Takeshi Kunishima; Takafumi Arai, all of Kanagawa; Katsunori Kitaru, Chiba; Wataru Kokubo, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/653,426

(22) Filed: Aug. 31, 2000

Related U.S. Application Data

(62) Division of application No. 08/898,064, filed on Jul. 22, 1997, now Pat. No. 6,195,322.

(30) Foreign Application Priority Data

Jul. 25, 1996 (JP) ................................. P08-196684

(51) Int. Cl.$^7$ ...................................... G11B 7/00
(52) U.S. Cl. ................... 369/47.44; 369/53.12; 369/53.14
(58) Field of Search ................. 369/47.4, 47.44, 369/47.49, 53.1, 53.12, 53.14, 53.15, 53.17

(56) References Cited

U.S. PATENT DOCUMENTS

| | | | |
|---|---|---|---|
| 5,381,393 | * 1/1995 | Ohtani | 369/77.2 |
| 5,612,933 | 3/1997 | Iso et al. | 369/32 |
| 5,636,193 | 6/1997 | Ohmi | 369/543 |
| 5,691,968 | 11/1997 | Tomishima et al. | 369/50 |
| 5,740,356 | * 4/1998 | Liang et al. | 395/183.22 |
| 5,774,292 | 6/1998 | Georgiou et al. | 360/73.03 |
| 5,815,478 | * 9/1998 | Kim | 369/50 |
| 5,844,866 | * 12/1998 | Fujimoto et al. | 369/50 |
| 5,844,872 | * 12/1998 | Kubo et al. | 369/44.35 |
| 5,862,113 | * 1/1999 | Tsuyuguchi et al. | 369/50 |

(List continued on next page.)

FOREIGN PATENT DOCUMENTS

| | | |
|---|---|---|
| 0464520 A1 | 1/1992 | (EP) . |
| 0696797 A2 | 2/1996 | (EP) . |
| WO 92/08228 | 5/1992 | (WO) . |
| WO 98/27549 | 6/1998 | (WO) . |

OTHER PUBLICATIONS

"12X Atapi CD–ROM Drive Unit DR–444 Product Specifications, Passage" Sep. 17, 1996, XP002066715, pp. 2–13 (p. 3, "Features", "Automatic CLV–CAV Mode Switching").

(List continued on next page.)

*Primary Examiner*—Nabil Hindi
(74) *Attorney, Agent, or Firm*—Oblon, Spivak, McClelland, Maier & Neustadt, P.C.

(57) ABSTRACT

Vibrations transferred to the outside are lessened and high performance against external vibrations and impact is maintained. Further, data is recorded and reproduced satisfactorily.

A CD-ROM drive device is provided which is capable of reproducing data at a standard speed, a quadruple speed and a sextuple speed. When a disk is mounted to the CD-ROM drive device, TOC information is read in a playback state at the standard speed (ST1). Next, the disk is placed in a playback state at the sextuple speed and is set to a state held at a predetermined address position (ST2). It is distinguished using a tracking error signal, a control signal for a spindle motor, etc. whether the disk is either an eccentric disk or an unbalance disk (ST3). When the disk is found not to be either the eccentric disk or the unbalance disk, a playback speed is set to the sextuple speed. On the other hand, when the disk is found to be either the eccentric disk or the unbalance disk, the playback speed is set to the quadruple speed. When the disk is found to be the unbalance disk, the playback speed is reduced to restrain the generation of self-induced vibrations at reproduction.

16 Claims, 19 Drawing Sheets

U.S. PATENT DOCUMENTS

| | | | |
|---|---|---|---|
| 5,893,048 | * 4/1999 | Pate et al. | 369/53.18 |
| 5,926,449 | 7/1999 | Hiok et al. | 369/54 |
| 5,963,517 | * 10/1999 | Nakagaki et al. | 369/47 |
| 5,963,520 | * 10/1999 | Kubo et al. | 369/54 |
| 5,982,725 | * 11/1999 | Kubo et al. | 369/50 |
| 6,009,053 | * 12/1999 | Ota et al. | 369/44.32 |

OTHER PUBLICATIONS

B. Thompson, "Fast, Faster, Fastest: CD–ROM's New 8X, 10X, 12X Drives," Emedia Professional, vol. 10, No. 2, Feb. 1997, pp. 30–50, XP002066713 (p. 36, Sidebar, Paragraph 5).

Patent Abstracts of Japan, JP 8–007456 Published Jan. 12, 1996, Aiwa Co. Ltd.

Patent Abstracts of Japan, JP 10–040640 Published Feb. 13, 1998, Hitachi Video Ind.

Patent Abstracts of Japan, JP 10–011882 Published Jan. 16, 1998, Toshiba Corp.

Patent Abstracts of Japan, JP 9–204741 Published Aug. 5, 1997, Sanyo Electric Co. Ltd.

* cited by examiner

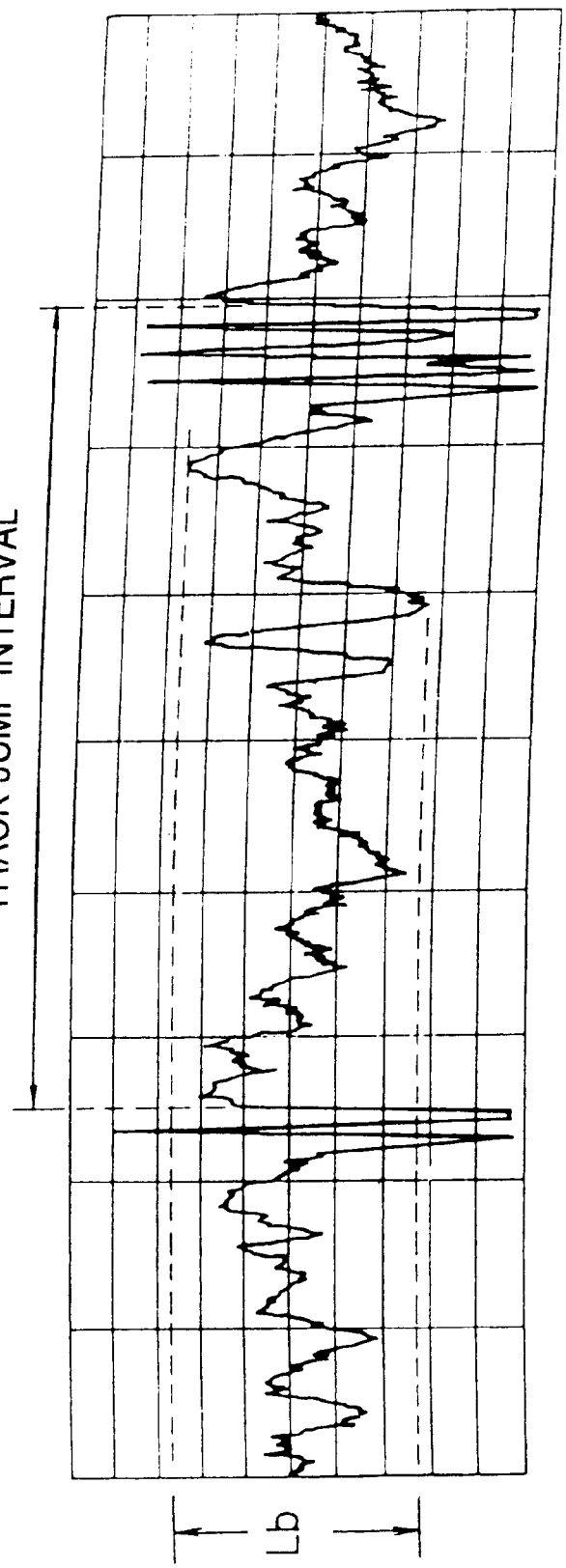
F I G. 5

DISK DRIVE DEVICE AND METHOD OF SETTING ROTATIONAL SPEED THEREOF

This application is a divisional of Ser. No. 08/898,064 filed Jul. 22, 1997, now U.S. Pat. No. 6,195,322.

BACKGROUND OF THE INVENTION

This invention relates to a disk drive device suitable for use in a CD-ROM (Compact Disk as Read Only Memory) or the like, for example, and a method of setting a rotational speed of the disk drive device. This invention relates specifically to a disk drive device for determining or distinguishing that a disk-shaped recording medium is either an eccentric disk or an unbalance disk in a state in which the disk-shaped recording medium is being rotated at a predetermined speed. When it is determined that the disk is either the eccentric disk or the unbalance disk, a rotational speed of the disk drive device is reduced to thereby lessen the vibrations transferred to the outside and to maintain high performance against external vibrations and impact, and satisfactorily perform a recording and reproducing operations. This invention also relates to a disk drive device or the like capable of, when it is determined in a state in which a disk-shaped recording medium is being rotated at a predetermined speed, that the disk-shaped recording medium is neither an eccentric disk nor an unbalance disk, increasing its rotational speed to thereby read data at high speed.

This invention relates to a disk drive device or the like, of a type wherein when it is distinguished in a state in which a disk-shaped recording medium is being rotated at a predetermined speed, that an external vibration or impact of a predetermined level or more has occurred, its rotational speed is reduced to thereby lessen the influence of the external vibration or impact of the predetermined level or more on recording and reproducing operations.

FIG. 20 shows a principal portion of a related CD-ROM drive device. Referring to FIG. 20, a pair of pin support holes (not shown) is defined in both side plates 50a of a fixed case. A pair of pins 53 of a base unit holder 52 is inserted into their corresponding pin support holes. An elevation pin 54 is provided on side opposite to the provision of the pair of pins 53 of the base unit holder 52. The elevation pin 54 is displaced in upward and downward directions by a base unit elevation mechanism (not shown) so that the one-end side of the base unit holder 52 moves up and down. Bosses 55 are placed in three points of the base unit holder 52. Threaded holes 56 are defined in their corresponding bosses 55.

A base unit 57 has a base plate 58 to which an optical pick-up unit 59 for reproducing data from a disk, a disk rotating unit 60 having a spindle motor for rotating the disk, etc. have been attached. Mounting holes 61 are respectively provided at three points of the base plate 58. The base unit 57 is mounted to the base unit holder 52 by using mounting vises 62 with insulator 63 used as damping members composed of rubber.

FIG. 21 shows a mounting portion of the base unit 57 in a developed form. Referring to FIG. 21, the insulators 63 are mounted in their corresponding mounting holes 61 defined in the base plate 58 of the base unit 57. The mounting vises 62 inserted into the holes of the insulators 63 are threadedly inserted into threaded holes 56 of the bosses 55 of the base unit holder 52.

In the aforementioned construction, an external vibration or impact is transmitted to the base unit holder 52 through the fixed case 50 without attenuation so far. The vibration transmitted to the base unit holder 52 is transmitted to the base unit 57 through the insulators 63 for providing damping action. Thus, the external vibration and impact is attenuated and applied to the base unit 57, so that the adverse effects of the vibration and impact thereon is lessened.

An external vibration characteristic of the base unit 57 has a resonance point at a range of 100 Hz to 120 Hz, for example, as shown in FIG. 22.

Further, the number of revolutions of the disk ranges from 200 rpm to 500 rpm (3.3 to 8.3 Hz) at a standard speed, ranges from 800 rpm to 2000 rpm (13 to 33 Hz) at a quadruple speed, ranges from 1200 rpm to 3000 rpm (20 to 50 Hz) at a sextuple speed, ranges from 1600 rpm to 4000 rpm (27 to 67 Hz) at an octuple speed, and ranges from 2400 rpm to 6000 rpm (40 to 100 Hz) at a dodecuple speed.

When the disk is an unbalance disk and is rotated at a high speed of about 3000 rpm, a self-induced vibration having a frequency corresponding to the number of revolutions of the disk occurs. There is a problem in that this self-induced vibration is transmitted to the outside of the drive device through the base unit 57 and the insulators 63, thus giving an unpleasant feeling to a user. Further, a problem arises in that tracking control of the optical pick-up unit 59 falls into difficulties due to this self-induced vibration, so that data cannot be reproduced from the disk.

FIG. 23 shows a transmission characteristic of each insulator 63. When the insulator 63 is formed of butyl rubber, a resonance point f0 of the insulator 63 can be set to a range of 25 to 130 Hz. As the resonance f0 is made greater, a Q value is reduced so that an attenuatable frequency is shifted to a high frequency.

It is desirable that the resonance point of the insulator 63 is set so as to attenuate 100 to 120 Hz corresponding to the resonance point of the vibration characteristic of the base unit 57 and escape from a frequency corresponding to the number of revolutions of the disk, which is to be used. However, since the number of revolutions to be used increases as in the case of the sextuple speed, octuple speed, . . . , it is difficult to satisfy the two.

Therefore, for example, the resonance point f0 of the insulator 63 was set so as to be higher than the maximum number of revolutions of the disk and to satisfy escaping from the frequency corresponding to the number of revolutions of the disk, which is to be used. Therefore, although the problem about the aforementioned self-induced vibration can be lessened, the range of 100 to 120 Hz corresponding to the resonance point of the vibration characteristic of the base unit 57 cannot be attenuated sufficiently, thus resulting in significant reduction in the performance against an external vibration and impact.

When the number of revolutions of the disk increases, the influence of the external vibration or impact on the tracking control or the like becomes strong in general. Thus, when the vibration and impact of the predetermined level or more occur, it is considered that the number of rotations of the disk is reduced and the influence of the vibration and impact on the reproduction of data from the disk is lessened.

Therefore, an object of the present invention is to lessen vibrations transferred to the outside, maintain high performance against an external vibration and impact, and satisfactorily perform recording and reproducing operations. Another object of the present invention is to lessen the influence of an external vibration or impact of a predetermined level or more on recording and reproducing operations.

SUMMARY OF THE INVENTION

A disk drive device according to the present invention, wherein a base unit provided with a disk rotating unit having a spindle motor for rotating a disk-shaped recording medium and with a head for performing at least one of recording and reproducing data into and from the disk-shaped recording medium, is mounted to a base unit holder through a damping member, comprises rotational speed control means for controlling the rotation of the spindle motor to thereby control a rotational speed of the disk-shaped recording medium to a set value; disk distinguishing means for determining, in a state in which the disk-shaped recording medium is being rotated, whether the disk-shaped recording medium is an eccentric disk or an unbalance disk; and rotational speed setting means for, when the disk distinguishing means has determined the disk-shaped recording medium as the eccentric disk or the unbalance disk, changing the set value to a second rotational speed slower than the first rotational speed in a state in which the disk-shaped recording medium is being rotated at a first rotational speed.

A method of setting a rotational speed of a disk drive device according to the present invention, wherein a base unit provided with a disk rotating unit having a spindle motor for rotating a disk-shaped recording medium and with a head for performing at least one of recording and reproducing data into and from the disk-shaped recording medium, is mounted to a base unit holder through a damping member, comprises the following steps: a first step for controlling the disk rotating unit so as to rotate the disk-shaped recording medium at a first rotational speed; a second step for distinguishing in a state in which the disk-shaped recording medium is being rotated at the first rotational speed, whether the disk-shaped recording medium is either an eccentric disk or an unbalance disk; and a third step for setting the rotational speed of the disk-shaped recording medium to a second rotational speed slower than the first rotational speed when the disk-shaped recording medium is either the eccentric disk or the unbalance disk.

The head records data into or reproduces it from the disk-shaped recording medium rotated and driven by the spindle motor. The rotational speed of the disk-shaped recording medium is controlled to set values such as a standard speed, a quadruple speed, a sextuple speed and so on. When the disk-shaped recording medium is being rotated, whether the disk-shaped recording medium is either an eccentric disk or an unbalance disk, is identified or distinguished. Whether the disk-shaped recording medium is either the eccentric disk or the unbalance disk, is distinguished by utilizing a point of view in which, for example, when the disk-shaped recording medium is either the eccentric disk or the unbalance disk, a tracking error signal and a control signal for the spindle motor are different in level range from the case in which the disk-shaped recording medium is a general disk.

When it is distinguished that the disk-shaped recording medium is either the eccentric disk or the unbalance disk, the rotational speed of the disk-shaped recording medium is set slow. When the disk-shaped recording medium is determined to be either the eccentric disk or the unbalance disk in a state in which the disk-shaped recording medium is being rotated at the sextuple speed, the disk-shaped recording medium is set to the quadruple speed.

When it is distinguished that the disk-shaped recording medium is neither the eccentric disk nor the unbalance disk, the rotational speed of the disk-shaped recording medium is set fast. When the disk-shaped recording medium is determined to be neither the eccentric disk nor the unbalance disk in a state of being rotated at the quadruple speed, the disk-shaped recording medium is set to the sextuple speed. The rotational speed of the disk-shaped recording medium may be set so as to increase from the quadruple speed to the octuple speed. If the detected reset playback speed is an unpleasant-feeling free speed if it is a reset speed, then an arbitrary playback speed can be selected within its range.

A disk drive device according to the present invention, which includes a disk rotating unit having a spindle motor for rotating a disk-shaped recording medium, and a head for performing at least one of recording and reproducing data into and from the disk-shaped recording medium, comprises rotational speed control means for controlling the rotation of the spindle motor to thereby control a rotational speed of the disk-shaped recording medium to a set value; vibration and impact distinguishing means for distinguishing whether an external vibration or impact of a predetermined level or more occurs, in a state in which the disk-shaped recording medium is being rotated; and rotational speed setting means for, when the vibration and impact distinguishing means has determined the occurrence of the external vibration or impact of the predetermined level or more in a state in which the rotational speed of the disk-shaped recording medium is at a first rotational speed, changing the set value to a second rotational speed slower than the first rotational speed.

A method of setting a rotational speed of a disk drive device according to the present invention, which includes a disk rotating unit having a spindle motor for rotating a disk-shaped recording medium, and a head for performing at least one of recording and reproducing data into and from the dish-shaped recording medium, comprises the following steps: a first step for controlling the disk rotating unit so as to rotate the disk-shaped recording medium at a first rotational speed; a second step for distinguishing in a state in which the disk-shaped recording medium is being rotated at the first rotational speed, whether an external vibration or impact of a predetermined level or more occurs; and a third step for setting the rotational speed of the disk-shaped recording medium to a second rotational speed slower than the first rotational speed when the external vibration or impact of the predetermined level or more occurs.

The head records data into or reproduces it from the disk-shaped recording medium rotated and driven by the spindle motor. The rotational speed of the disk-shaped recording medium is controlled to set values such as a standard speed, a quadruple speed, a sextuple speed. When the disk-shaped recording medium is being rotated, whether the external vibration or impact of the predetermined level occurs is identified or distinguished. Whether the external vibration or impact of the predetermined level or more occurs is distinguished by utilizing a change in the level range of each of a tracking error signal and a control signal for the spindle motor when, for example, the external vibration or impact of the predetermined level or more occurs.

When it is distinguished that the external vibration or impact of the predetermined level or more has occurred, the rotational speed of the disk-shaped recording medium is set slow. When the external vibration or impact of the predetermined level or more is determined to have occurred in a state in which the disk-shaped recording medium is being rotated at the sextuple speed, the disk-shaped recording medium is set to the quadruple speed. As a modification of the aforementioned third step, the rotational speed can be also controlled to a rotational speed (sextuple or octuple speed) faster than the slow rotational speed (standard rotational speed to be detected, e.g., quadruple speed) when the disk-shaped recording medium is found not to be either an eccentric disk or an unbalance disk.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings.

FIG. 5 is a diagram illustrating a tracking error signal of each of an eccentric disk and a mass eccentric disk placed in holding states in the CD-ROM drive device shown in FIG. 1;

DETAILED DESCRIPTION OF THE PREFERRED EMB0DIMENTS

Preferred embodiments of the present invention will hereinafter be described with reference to the accompanying drawings.

Figure 1:
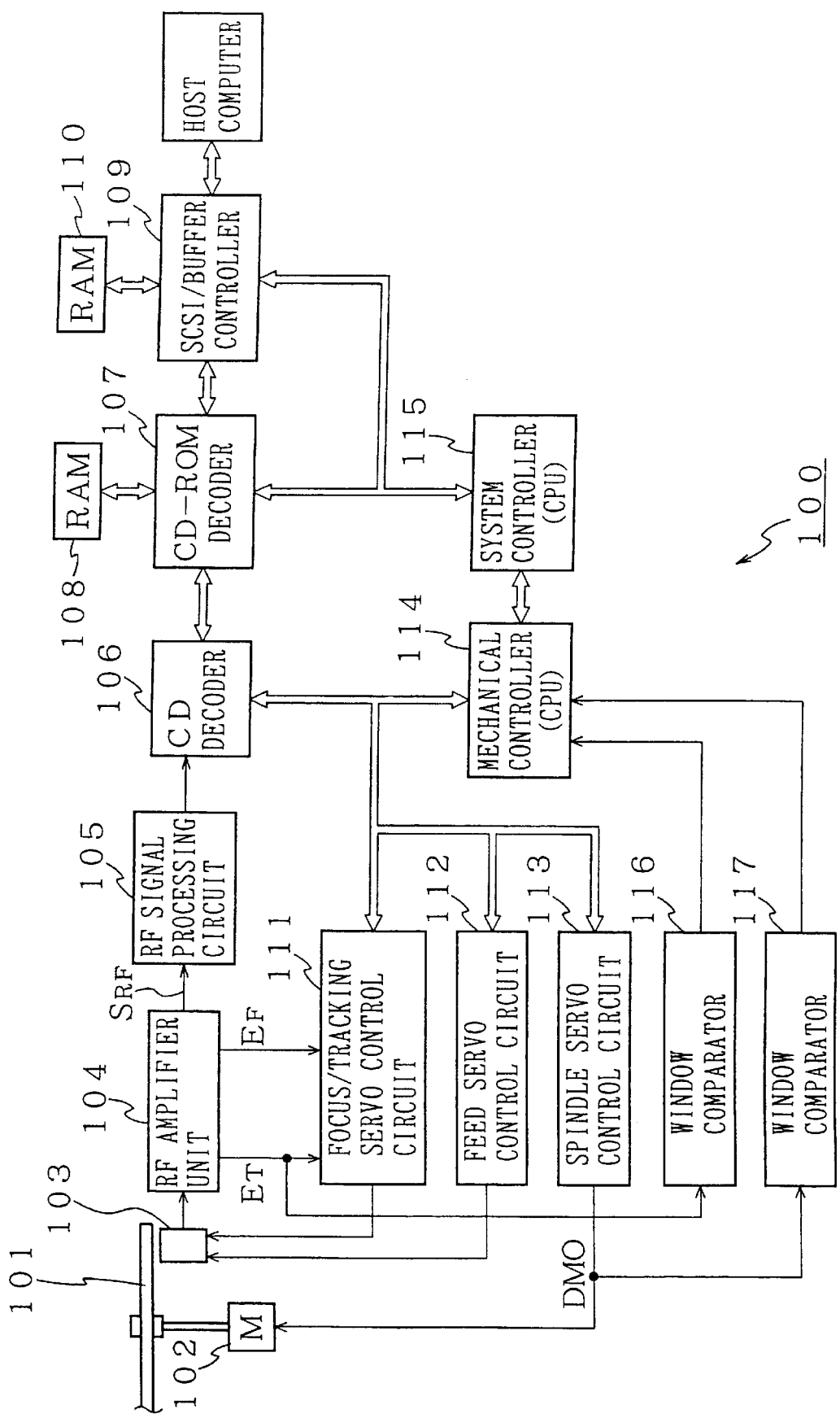
FIG. 1 is a block diagram showing a CD-ROM drive device according to one embodiment of the present invention.

FIG. 1 shows a CD-ROM drive device 100 as one embodiment.

The CD-ROM drive device 100 has a spindle motor 102 for rotating and driving a disk 101 at a predetermined linear velocity. Although not described above, the CD-ROM drive device 100 is capable of playing back or reproducing data at a standard speed, a quadruple speed and a sextuple speed. The disk 101 is driven so as to rotate at 200 rpm (outer periphery) to 500 rpm (inner periphery) upon data reproduction at the standard-speed. Upon data reproduction at the quadruple speed, the disk 101 is driven so as to rotate at 800 rpm (outer periphery) to 2000 rpm (inner periphery). Further, the disk 101 is driven so as to rotate at 200 rpm (outer periphery) to 3000 rpm (inner periphery) upon data reproduction at the sextuple speed.

Further, the CD-ROM drive device 100 has an optical pick-up unit 103 used as a head for reproducing data from the disk 101, and a RF amplifier unit 104 for electrically processing signals outputted from a plurality of optical detectors constituting the optical pick-up unit 103 to obtain a playback or reproduce RF signal SRF, a tracking error signal ET and a focus error signal EF.

A laser beam (not shown) emitted from a semiconductor laser that constitutes the optical pick-up unit 103, is applied to a recording surface of the disk 101. Its reflected light is applied to the plurality of optical detectors, e.g., six-divided detectors. The signals outputted from the plurality of optical detectors are supplied to the RF amplifier unit 104. The RF amplifier unit 104 produces the tracking error signal ET by a three-spot method, for example, and produces the focus error signal EF by an astigma method.

The CD-ROM drive device 100 has a RF signal processing circuit 105 for performing a process such as waveform equalization on the playback RF signal SRF outputted from the RF amplifier 104, and a CD decoder 106 for effecting an EFM (Eight to fourteen Modulation) demodulating process and an error-correcting process by CIRC (Cross Interleave Reed-Solomon Code) on a signal outputted from the RF signal processing circuit 105.

The CD-ROM drive device 100 includes a CD-ROM decoder 107 for effecting a descrambling process, an error detecting and correcting process, and so on on data outputted from the CD decoder 106 to thereby obtain data for a CD-ROM. A RAM (random access memory) 108 used as a working memory for executing the aforementioned processes is electrically connected to the CD-ROM decoder 107.

The CD-ROM drive device 100 has an SCSI (Small Computer System Interface)/buffer controller 109 for transferring the CD-ROM data outputted from the CD-ROM decoder 107 to a host computer through a RA 110 used as a buffer memory, receiving a command from the host computer and supplying it to a system controller.

The CD-ROM drive device 100 includes a focus/tracking servo control circuit 111 for effecting focus servo control and tracking servo control on the optical pick-up control 103, based on the focus error signal EF and the tracking error signal ET outputted from the RF amplifier unit 104, a feed servo control circuit 112 for shifting the optical pick-up unit 103 upon access, and a spindle servo control circuit 113 for controlling the number of revolutions of the spindle motor 102 to a predetermined value.

Now, the optical pick-up unit 103 is shifted by reference to address information about minutes, seconds and blocks, which have been recorded on headers of respective blocks of the CD-ROM data, for example. The address information is extracted from the CD-ROM data by the CD-ROM decoder 107. Further, CLV (Constant Linear Velocity) control of the spindle motor 102 is performed so that the length of a frame synchronizing portion longest in bit is measured and the measured length becomes a reference time length (any of standard, quadruple and sextuple speeds different from each other). Operations of the servo control circuits 111 through 113 are controlled by a mechanical controller 114 having a CPU.

The CD-ROM drive device 100 has a system controller 115 for controlling the entire operation of the system. The system controller 115 has a CPU.

The CD-ROM drive device 100 has a window comparator 116 for comparing the level of the tracking error signal ET with upper and lower threshold values indicative of a predetermined range and supplying its compared output to the mechanical controller 114, and a window comparator 117 for comparing the level of a control signal DMO with upper and lower threshold values indicative of a predetermined range and supplying its compared output to the mechanical controller 114. As will be described later in the present embodiment, whether or not the disk 101 is of an eccentric disk or a mass eccentric disk upon mounting the disk 101, is identified based on the compared outputs of the window comparators 116 and 117. It is thereafter identified to be external vibrations or impact above a predetermined level.

The tracking error signal ET and control signal DMO may be directly supplied to the mechanical controller 114 and not through the window comparators 116 and 117.

Figure 20:
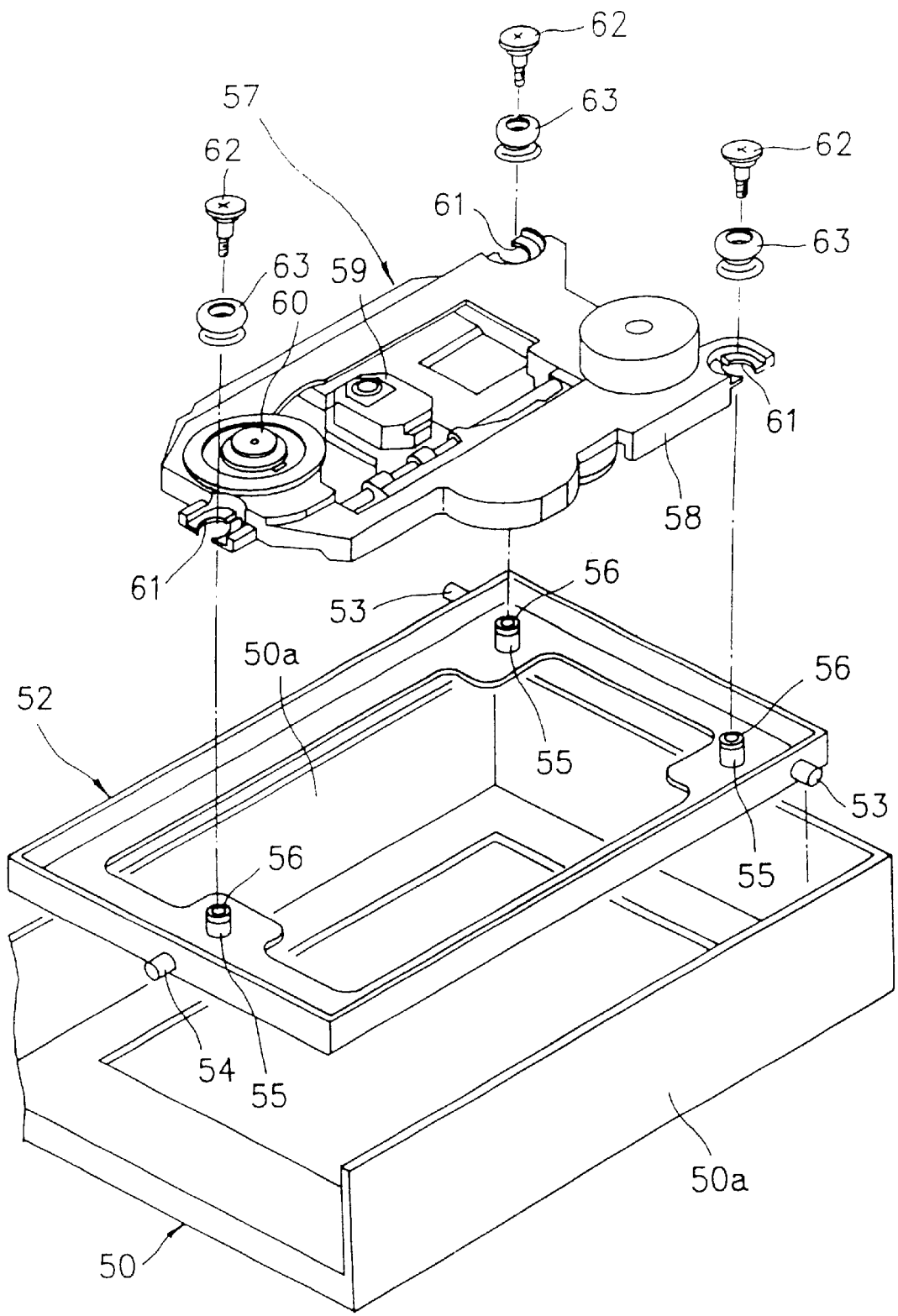
FIG. 20 is an exploded perspective view showing a principal portion of a related CD-ROM drive device.
Figure 21:
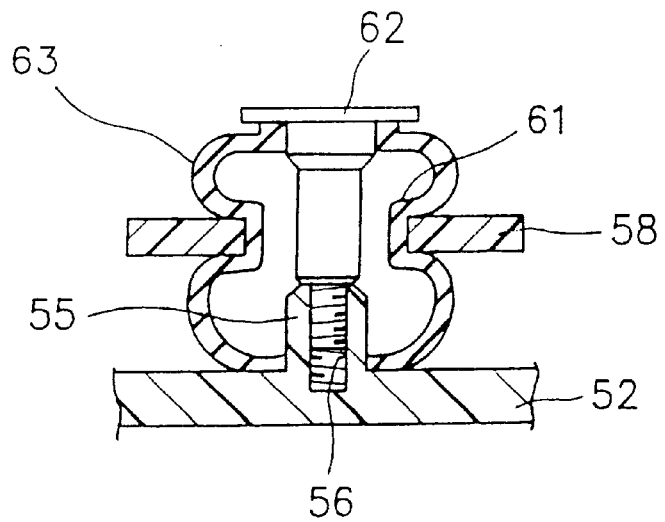
FIG. 21 is a cross-sectional view illustrating a mounting portion of a base unit of the related CD-ROM drive device.
Figure 22:
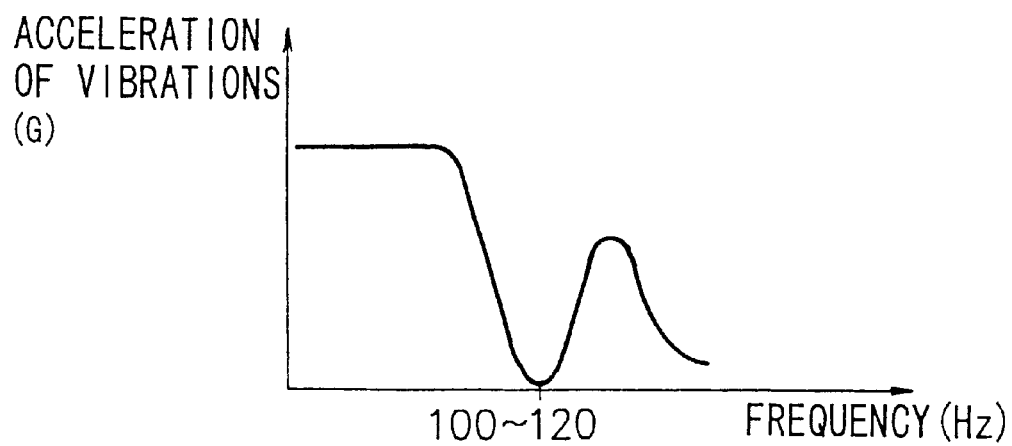
FIG. 22 is a diagram showing an external vibration characteristic of the base unit of the related CD-ROM drive device.
Figure 23:
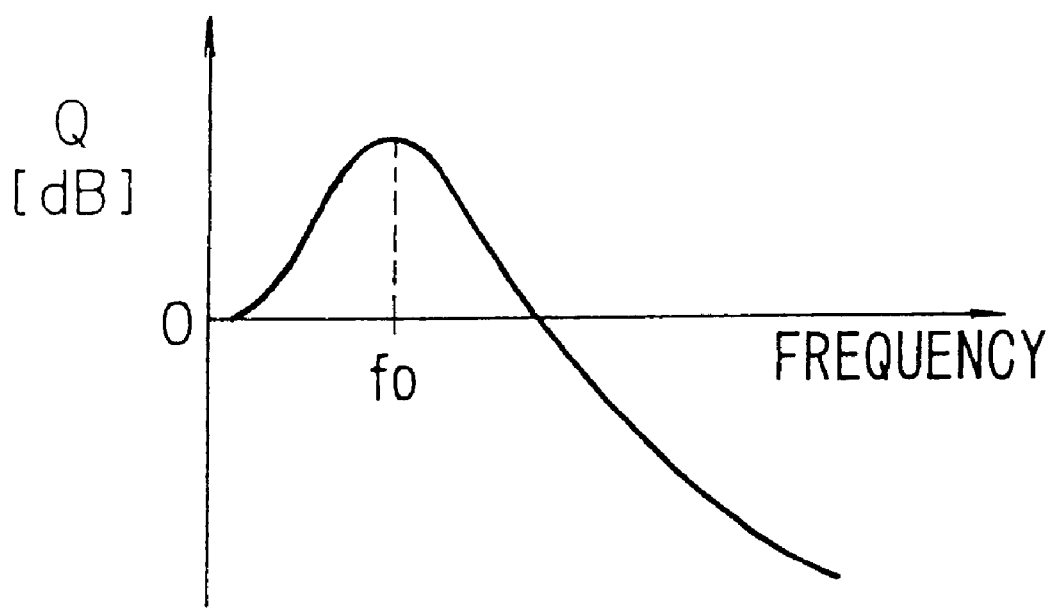
FIG. 23 is a diagram illustrating a transmission characteristic of an insulator of the related CD-ROM drive device.

In the CD-ROM drive device 100, a disk rotating unit having the spindle motor 102 for rotating the disk 101 and the optical pick-up unit 103 for reproducing data from the disk 101 are fixed to a base unit. Further, the base unit is mounted to a base unit holder through an insulator used as a control member (see FIG. 20) A resonance point f0 (see FIG. 23) of the insulator is set relatively low so as to sufficiently attenuate a resonance point of the base unit, e.g., 100 to 120 Hz (see FIG. 22). Thus, the resonance point f0 is not set so as to escape from a frequency based on the number of revolutions to be used.

The operation of the CD-ROM drive device 100 shown in FIG. 1 will next be described.

When a read command is transferred from the host computer, the system controller 115 controls the servo control circuits 111 and 112 through the mechanical controller 114 to shift the optical pick-up unit 103 to a target address position of a track on the disk 101 by reference to the aforementioned block address information.

According to the target address position, the reproduce RF signal reproduced by the optical pick-up unit 103 is subjected to the process such as waveform equalization by the RF signal processing circuit 105, and then supplied to the CD decoder 106. The CD decoder 106 effects an EFM modulating process or a CIRC error-correcting process on the output signal of the RF signal processing circuit 105. Further, the output data of the CD decoder 106 is supplied to the CD-ROM decoder 107, where a descrambing process, an error detecting and correcting process and the like are effected on the data to thereby obtain CD-ROM data. Thereafter, the CD-ROM data is transferred to the host computer through the RAM 110 as the buffer memory in predetermined timing under the control of the SCSI/buffer controller 109.

Upon mounting the disk 101, the CD-ROM drive device 100 shown in FIG. 1 rotates the disk 101 at the sextuple speed and identifies or determines in this condition whether or not the disk 101 corresponds to the eccentric disk or mass eccentric disk. The term eccentric disk is a disk in which the center of a center hole thereof coincides with the position of the center of gravity thereof but does not coincide with the center of a spiral track. Further, the mass eccentric disk is a disk in which the center of a center hold thereof coincides with the center of a spiral track but does not coincide with the position of the center of gravity thereof.

When it is determined that the disk 101 does not correspond to the eccentric disk or the mass eccentric disk, the playback speed is set to the sextuple speed. On the other hand, when the disk 101 is found to be the eccentric disk or the mass eccentric disk, the playback speed is set to the quadruple speed other than the sextuple speed.

This is because there is a possibility that when the playback speed reaches approximately the sextuple speed if the disk 101 is of the mass eccentric disk, a self-induced vibration is produced so that tracking control on the optical pick-up unit 103 falls into difficulties, whereby data will not be reproduced satisfactorily from the disk 101. The resonance point f0 of the insulator mounted between the based unit and the base unit holder is set so as to sufficiently attenuate the resonance point of the vibration characteristic of the base unit and set so as not to escape from the frequency based on the number of revolutions to be used. This intends to control the self-induced vibration by lowering the playback speed and prevent the self-induced vibration to the outside through the insulator.

Further, there is a possibility that if the playback speed is high and the number of revolutions of the disk 101 increases when the disk 101 is the eccentric disk, the tracking control on the optical pick-up unit 103 falls into difficulties, whereby data will not be reproduced satisfactorily from the disk 101.

Figure 2:
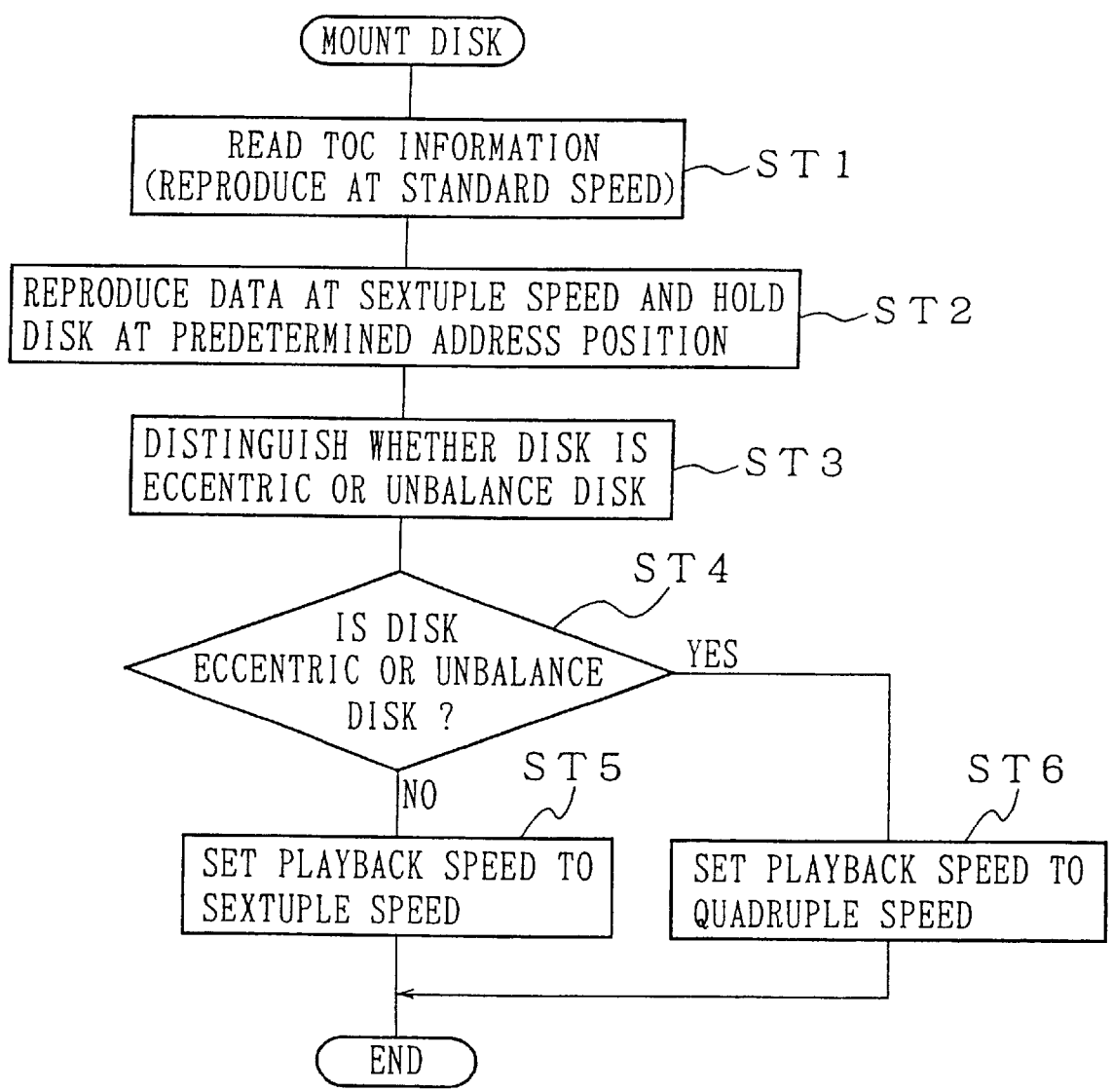
FIG. 2 is a flowchart for describing the control operation of a system controller at the time that a disk has been mounted to the CD-ROM drive device shown in FIG. 1.

FIG. 2 shows the control operation of the system controller 115 at the time of the mounting of the disk 101.

When the disk 101 is first mounted, the system controller 115 reads TOC (Table of Contents) information as a reproduced state of the disk 101 at the standard speed in Step ST1.

Figure 3:
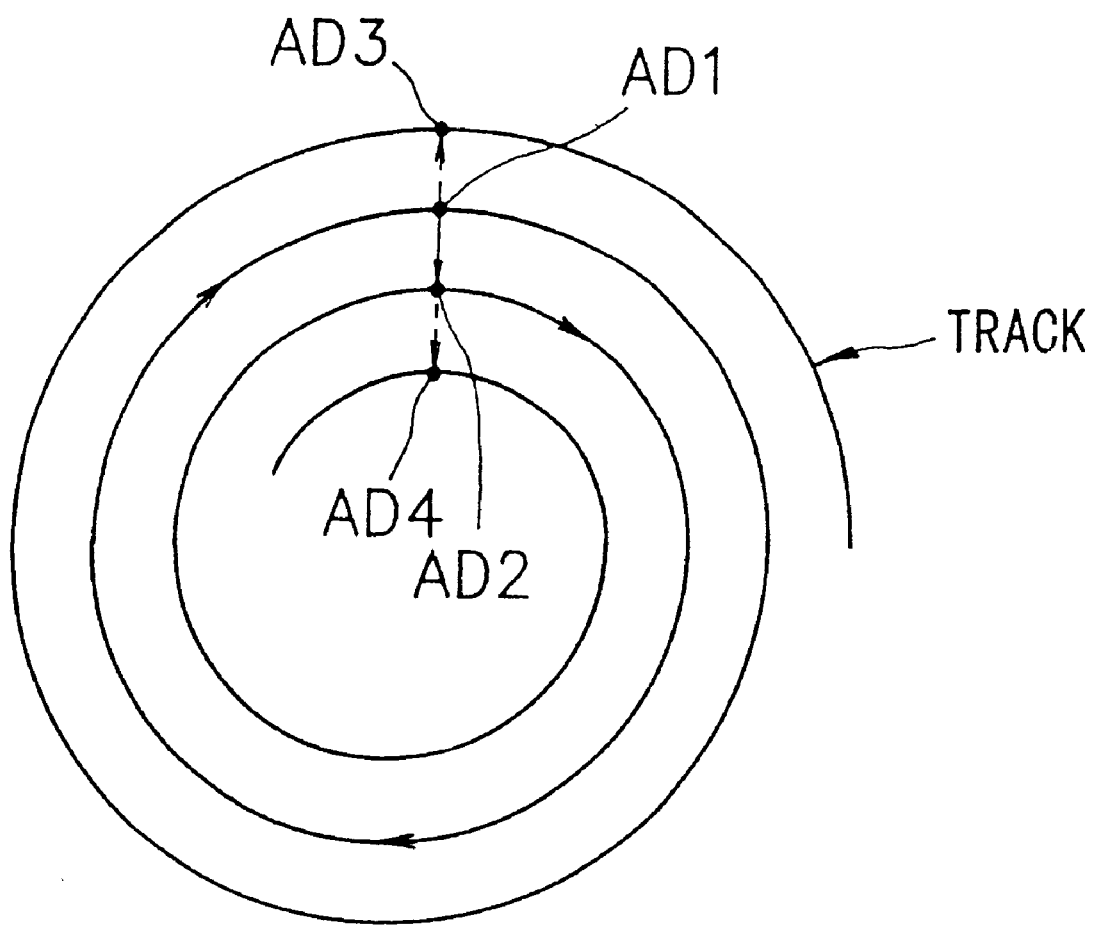
FIG. 3 is a diagram for explaining a holding state of the disk mounted to the CD-ROM drive device shown in FIG. 2.

Next, in Step ST2, the disk 101 is set to a reproduced state at the sextuple speed and placed in a held state at a predetermined address position. That is, as shown in FIG. 3, the optical pick-up unit 103 controls the optical pick-up unit 103 so that the optical pick-up unit 103 track-jumps on an address position AD2 of the immediately preceding track each time the optical pick-up unit 103 comes to a position AD1 of a predetermined address of a track on the disk 101. In this case, the predetermined address position at which the disk 101 is in the held state, will be defined as an address position, e.g., 0 minute, 2 seconds and 0 block on the inner periphery side at which the number of revolutions of the disk 101 increases.

Next, in Step ST3, the system controller 115 identifies or determines whether the disk 101 corresponds to the eccentric disk or the mass eccentric disk. When it is determined that the disk 101 does not correspond to the eccentric disk or the mass eccentric disk, the playback speed is set to the sextuple speed and the control operation is completed. On the other hand, when the disk 101 is found to be either the eccentric disk or the mass eccentric disk in Step ST4, the playback speed is set to the quadruple speed and the control operation is completed.

The determination or identification in Step ST3 as to whether the disk 101 is either the eccentric disk or the mass eccentric disk, is performed according to (1) whether or not the level of the tracking error signal ET during a period except for a track-jump period falls within the predetermined range, (2) whether or not the track-jump period is constant, (3) whether or not the address position where the optical pick-up unit 103 is located, is constant after its track jump, and (4) whether or not the level of the control signal DMO of the spindle motor 102 falls within the predetermined range. That is, its identification is performed according to all the method of (1) through (4). When it is determined that the disk 101 is of either the eccentric disk or the mass eccentric disk according to any of (1) through (4), the disk 101 is determined to be either the eccentric disk or the mass eccentric disk.

A description will first be made of the case in which whether the disk 101 is of either the eccentric disk or the mass eccentric disk, is identified by the tracking error signal ET existing during the period other than the track jump period.

Even in the case of the use of the tracking error signal ET, there are two cases: where the tracking signal ET is directly used and where the tracking error signal ET subsequent to its filtering process, which has been transmitted through a low-pass filter, is used. An example of the former will first be described in detail.

Figure 4:
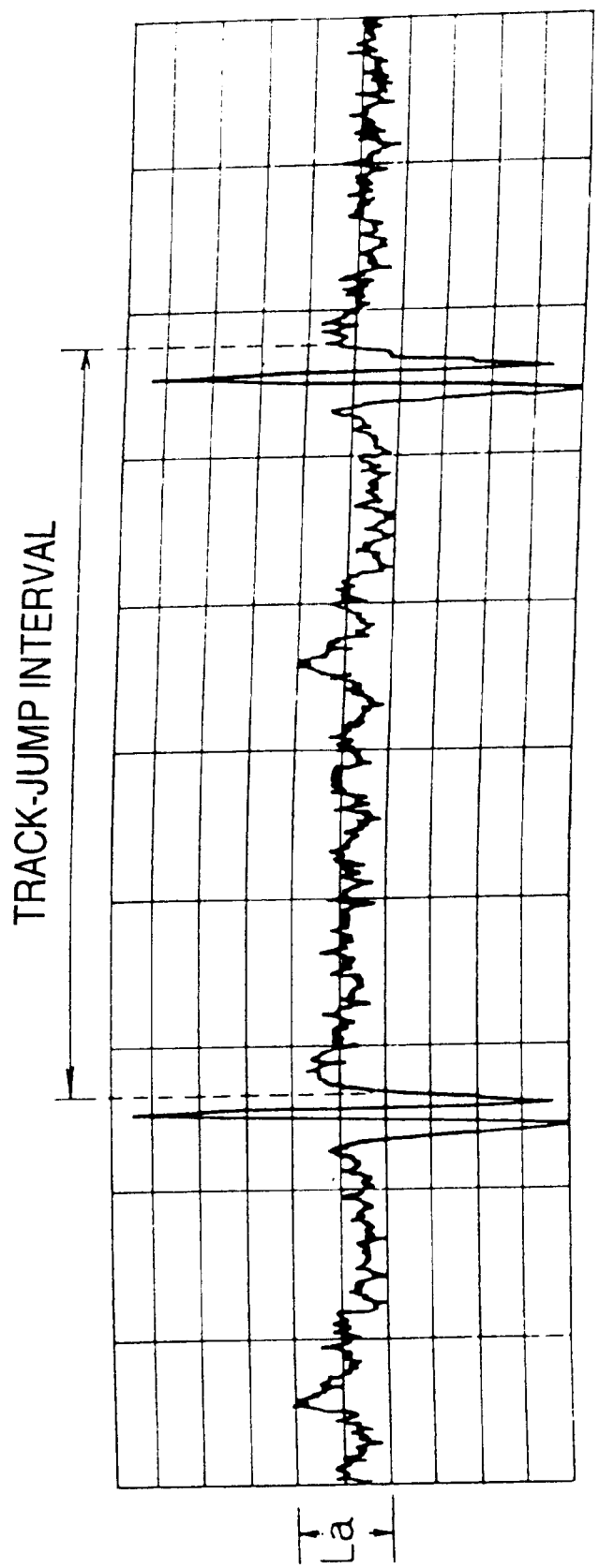
FIG. 4 is a diagram showing a tracking error signal or a normal disk placed in a holding state, which is mounted to the CD-ROM drive device shown in FIG. 1.

FIG. 4 shows a tracking error signal ET at the time that the disk 101 is of a normal disk other than the eccentric disk or the mass eccentric disk. A level range La of the tracking error signal ET existing during a period other than a track-jump period, is narrow. In contrast to this, FIG. 5 shows a tracking error signal ET at the time that the disk 101 is either the eccentric disk or the mass eccentric disk. A level range Lb of the tracking error signal ET existing during a period other than a track-jump period, becomes broad.

This is because when the disk 101 is an eccentric disk, the displacement of the position of the optical pick up unit 103 with respect to the track on the disk 101 becomes great. This is also because when the disk 101 is a mass eccentric disk, a self-induced vibration occurs and the disk 101 and the optical pick-up unit 103 vibrate correspondingly, so that the displacement of the position of the optical pick-up unit 103 with respect to the track on the disk 101 becomes great.

It is therefore possible to identify whether the disk 101 is the eccentric disk or the mass eccentric disk, according to whether the level of the tracking error signal ET existing during the period other than the track-jump period falls within the predetermined range. That is, when the level of the tracking error signal ET exceeds the predetermined range, it is identified that the disk 101 is of the mass eccentric disk. In the present embodiment, this identification is performed by the mechanical controller 114 based on the aforementioned compared output of the window comparator 116. Thereafter, information about the identification is supplied to the system controller 115.

A description will next be made of a case in which a tracking error signal FMO subjected to the filtering process is used for the detection of the eccentric disk or the mass eccentric disk.

Various noise components are mixed into the tracking error signal ET outputted from the RF signal processing circuit 105 as well as signal components associated with the eccentricity or mass eccentricity of the disk. According to various experiments, it was confirmed that a tracking error signal FMO subjected to a suitable filtering would have an amplitude value corresponding to the amount of eccentricity of the disk, or the amount of mass eccentricity of the disk and the correlation between the amount of eccentricity of the disk and the amount of mass eccentricity of the disk appeared well.

Figure 6:
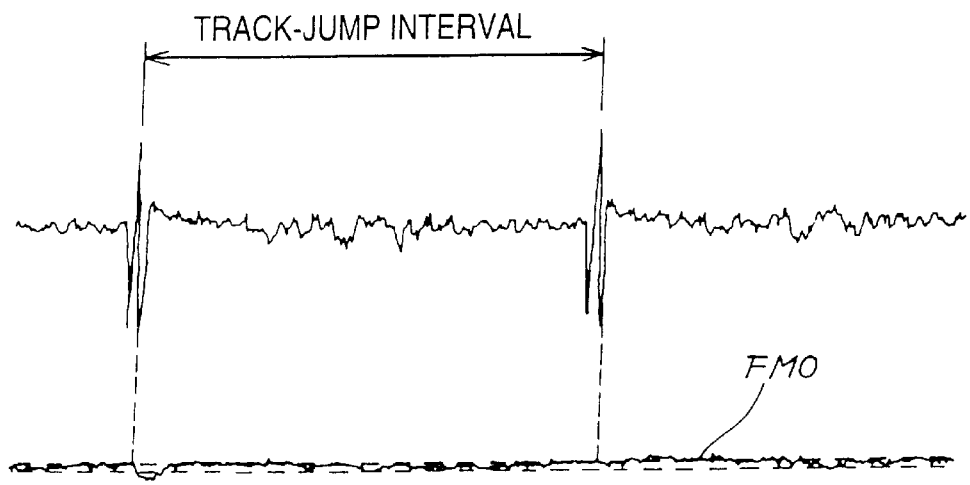
FIG. 6 is a diagram a tracking error signal obtained when a first eccentric disk is used in the CD-ROM drive device shown in FIG. 1.

FIG. 6 is a waveform chart showing the relationship between a track-jump waveform and a tracking error signal FMO at a timing when the amount of mass eccentricity of the disk, (the value of mass eccentricity thereof) is 0.066 gcm. Since the amount of mass eccentricity is extremely small in this case, the correlation between the mass eccentricity and the waveform (variation in the amplitude) is rough or low.

Figure 7:
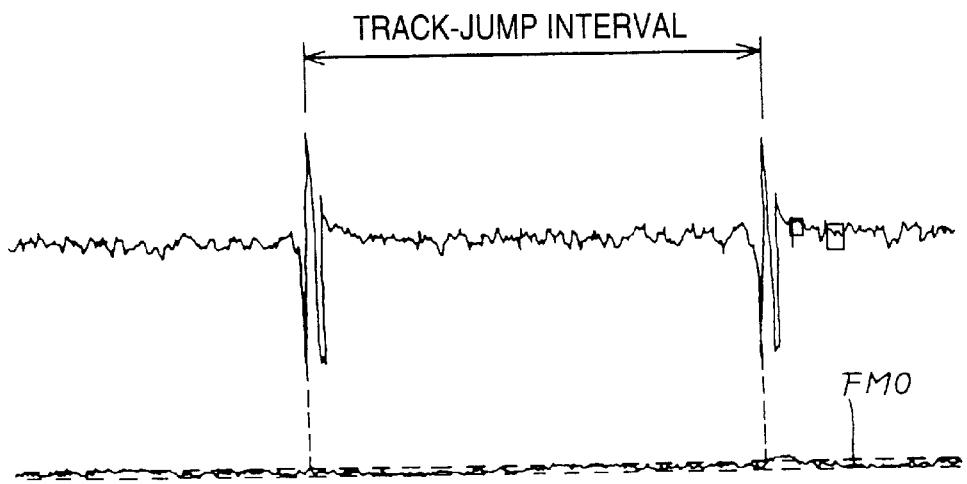
FIG. 7 is a diagram showing a tracking error signal obtained when a second eccentric disk is used in the CD-ROM drive device shown in FIG. 1.
Figure 8:
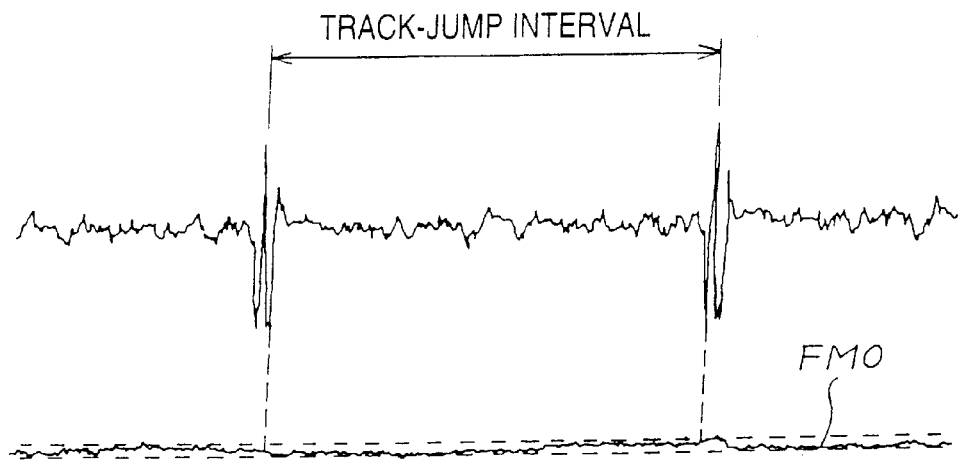
FIG. 8 is a diagram illustrating a tracking error signal obtained when a third eccentric disk is used in the CD-ROM drive device shown in FIG. 1.
Figure 9:
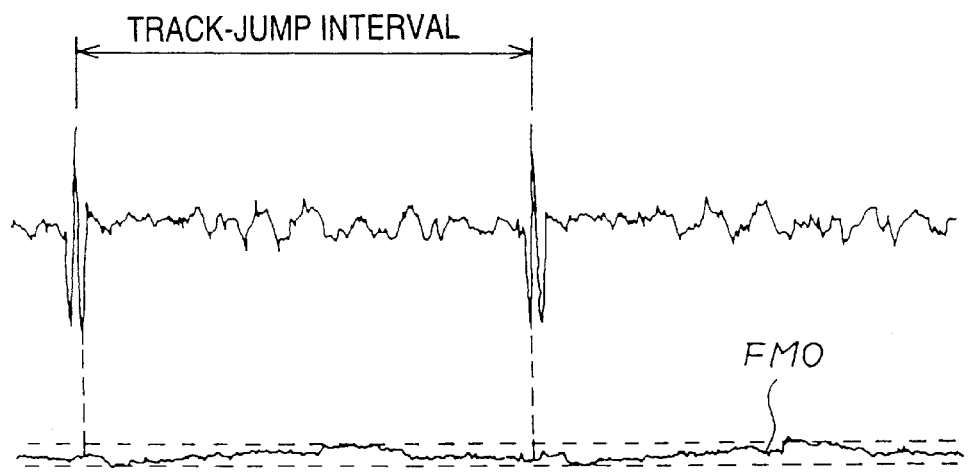
FIG. 9 is a diagram depicting a tracking error signal obtained when a fourth eccentric disk is used in the CD-ROM drive device shown in FIG. 1.
Figure 10:
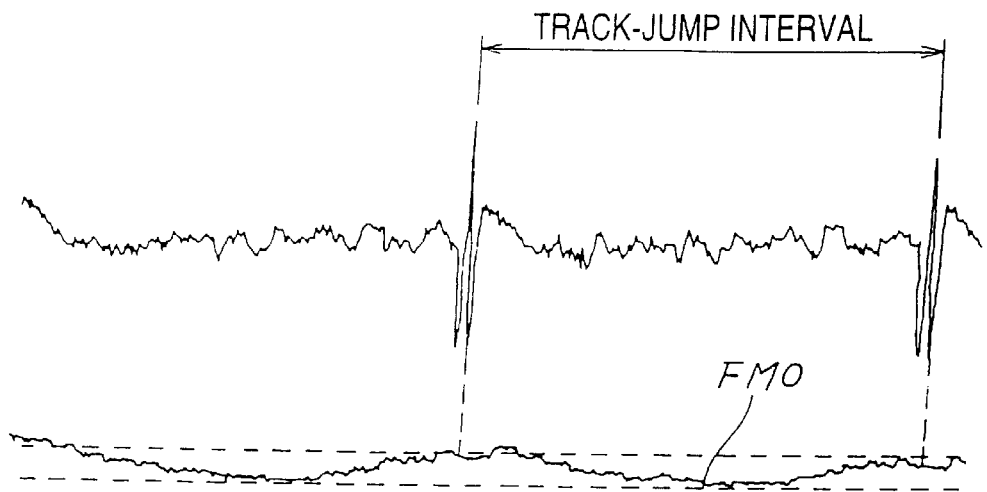
FIG. 10 is a diagram showing a tracking error signal obtained when a fifth eccentric disk is used in the CD-ROM drive device shown in FIG. 1.
Figure 11:
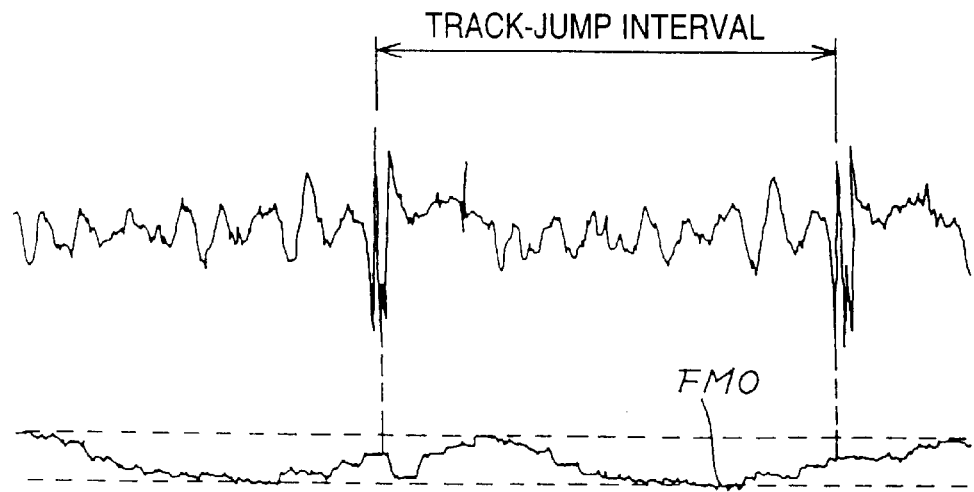
FIG. 11 is a diagram illustrating a tracking error signal obtained when a sixth eccentric disk is used in the CD-ROM drive device shown in FIG. 1.

FIG. 7 is a characteristic diagram similar to that shown in FIG. 6 at a timing when the amount of mass eccentricity is 0.2 gcm. Since the amount of mass eccentricity is small in this case, the correlation between the mass eccentricity and the waveform is low. FIG. 8 is a characteristic diagram at the time that the amount of mass eccentricity is 0.388 gcm. FIG. 9 is a characteristic diagram at the time that the amount of mass eccentricity is 0.606 gcm. When the amount of mass eccentricity reaches approximately 0.6 gcm, the correlation between the mass eccentricity and the waveform is strongly developed in the waveform of the tracking error signal FMO. Accordingly, the amount of mass eccentricity further increases to reach 0.8 gcm as shown in FIG. 10. As the amount of mass eccentricity reaches 10 gcm, a signal waveform in which the correlation is stronger is obtained.

Figure 12:
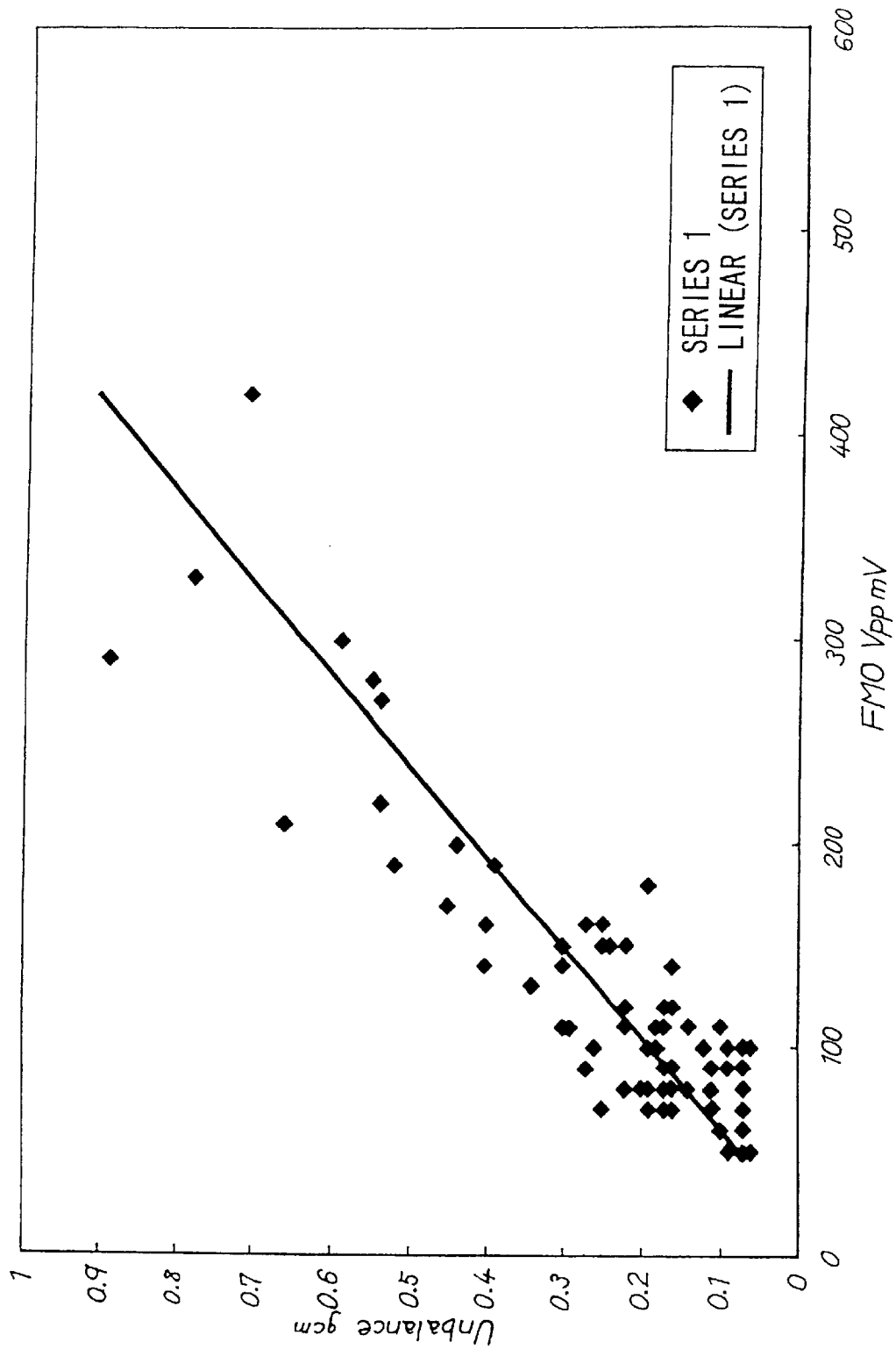
FIG. 12 is a diagram showing the relationship between mass eccentric and tracking error signals, which is obtained when a large number of eccentric disks are used in the CD-ROM drive device shown in FIG. 1.

Thus, the use of the tracking error signal FMO subjected to the suitable filtering process allows accurate identification of the mass eccentricity or eccentricity of the disk as compared with the case in which the mass eccentricity or eccentricity of the disk is identified based on the tracking error signal ET subjected to no filtering. FIG. 12 shows the relationship between unbalance and a tracking error signal FMO at the time that a large number of disks to be detected are used. It is understood from FIG. 12 that the amplitude of the tracking error signal FMO becomes great in proportion to the amount of unbalance as linearly shown in the drawing.

Figure 13:
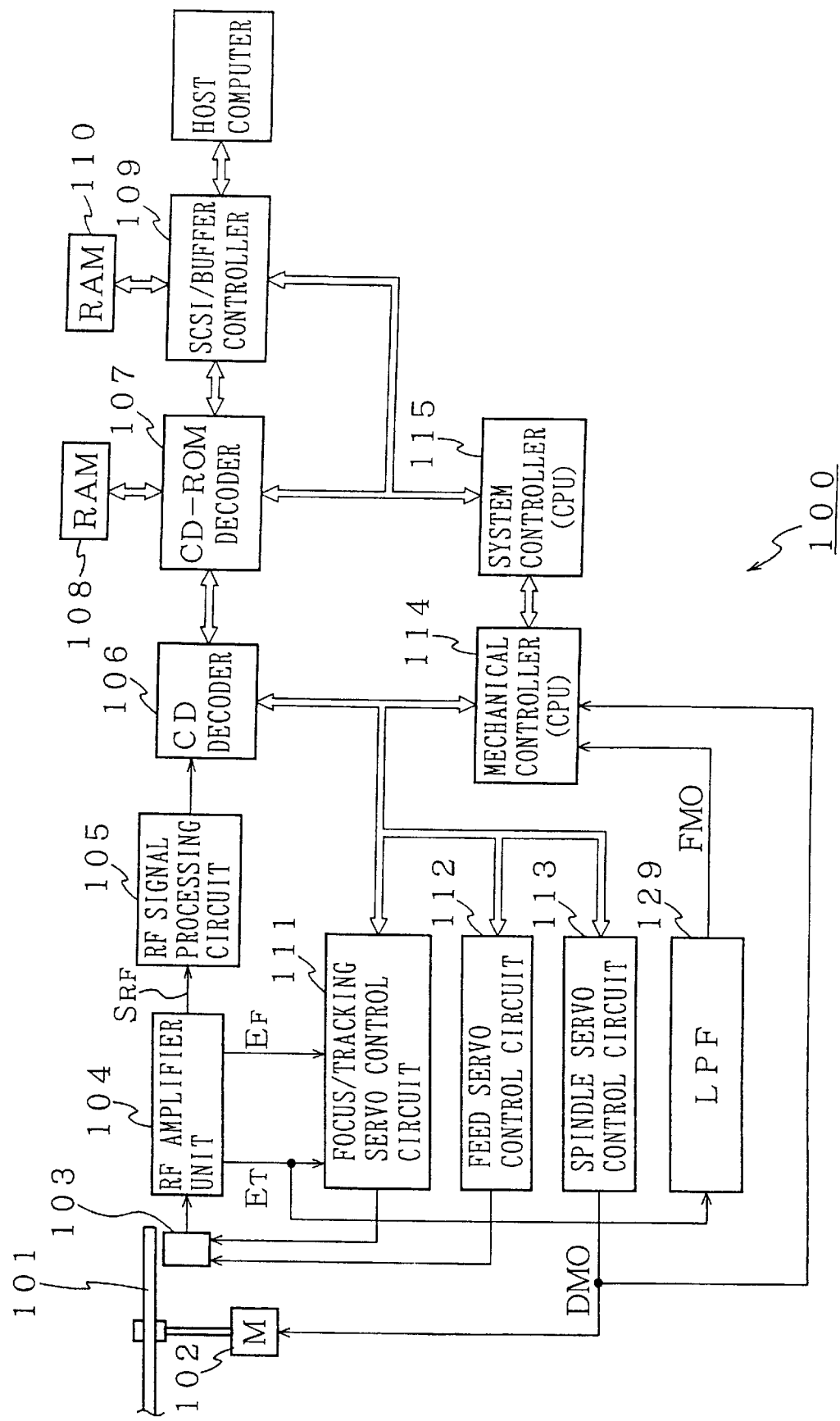
FIG. 13 is a diagram illustrating a configuration of an optical disk device used as another embodiment of the present invention, which has taken filtering into consideration.

Specific examples of the filtering process effected on the tracking error signal ET will hereinafter be described. FIG. 13 shows a first embodiment thereof. A tracking error signal ET outputted from a RF signal processing circuit 105 is supplied to a tracking servo control circuit 111 and a low-pass filter 129 where a predetermined frequency or above is cut.

A cutoff frequency of the low-pass filter 129 slightly varies according to a playback speed defined as the standard for detecting the eccentricity of a disk or unbalance thereof. When, for example, a quadruple speed (2000 rpm) or sextuple speed (3000 rpm) is regarded as the standard, each of the frequencies about twice their rotational frequencies (33 Hz and 50 Hz) is selected as a cut-off frequency (about 100 Hz).

A tracking error signal FMO whose high frequency has been cut off, is supplied to a mechanical controller 114 where the eccentricity of the disk or the unbalance thereof is determined. The window comparator 116 shown in FIG. 1 can be provided as needed.

Figure 14:
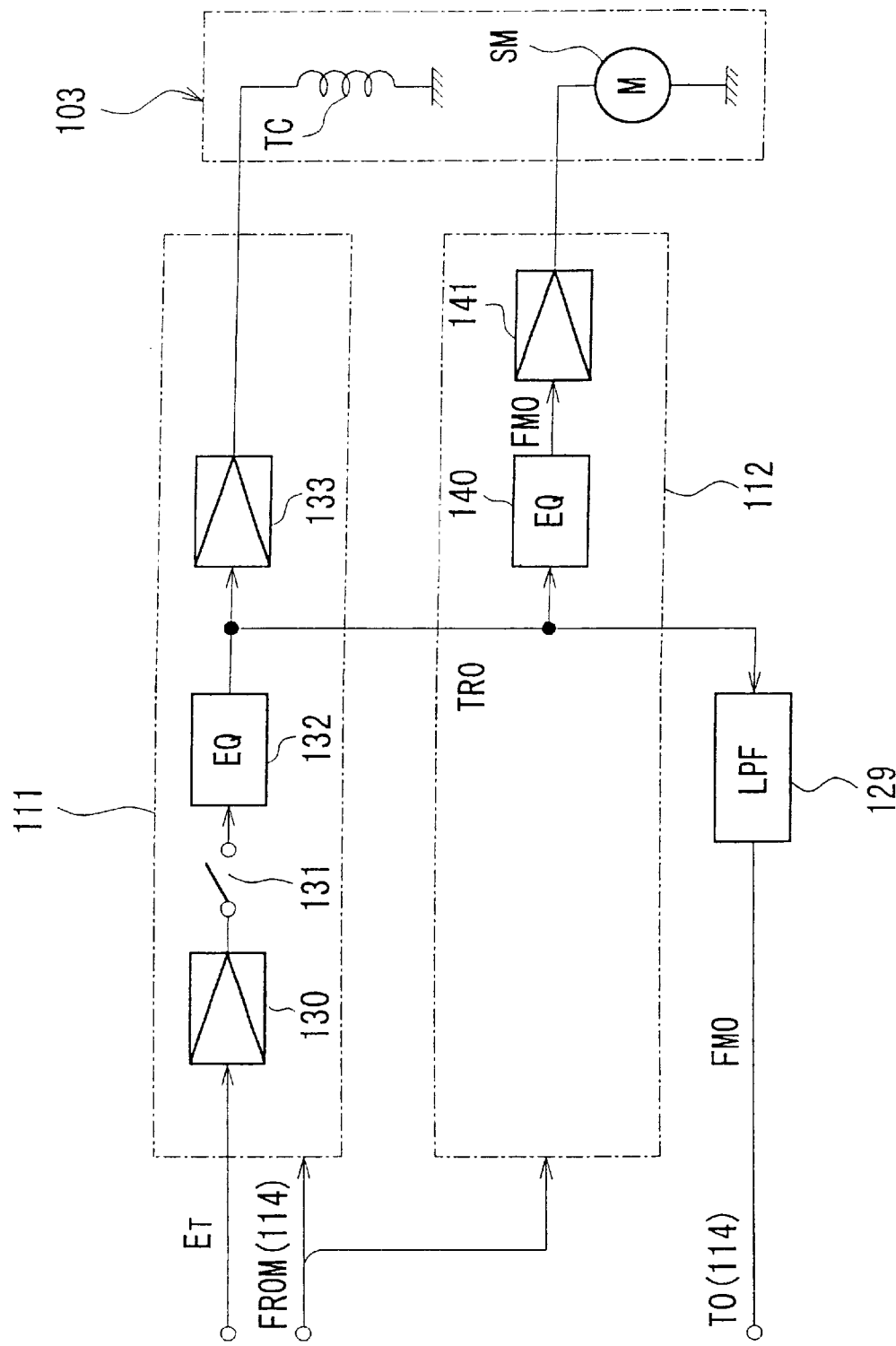
FIG. 14 is a diagram showing another configuration of a principal portion in the drawing illustrating the optical disk device shown in FIG. 13.

FIG. 14 shows an example using an equalizer output provided within a tracking servo control circuit 111. Only its fragmentary component is partly extracted and shown in the drawing. The tracking error signal ET is supplied to a tracking coil TC through a preamplifier 130, a switch 131, an equalizer amplifier 132 and a power amplifier 133. Control on the radial direction of the disk is executed by the tracking coil of control biaxial coils of an objective lens (not shown).

A switch 131 is turned off when no tracking servo is done. The switch 131 is controlled by the mechanical controller 114.

A tracking error signal TRO corresponding to the output of the equalizer amplifier 132 is supplied to a thread servo control circuit 112. The thread servo control circuit 112 is composed of an equalizer amplifier 140 and a power amplifier 141. The equalizer amplifier 140 is supplied with a command signal issued from the mechanical controller 114 as well as with the tracking error signal TRO to perform control for shifting the optical pick-up unit 103 in a desired direction.

A portion of the tracking error signal TRO supplied to the equalizer amplifier 140 is supplied to the low-pass filter 129 where a tracking error signal FMO related to the eccentricity or unbalance of the disk is extracted. The tracking error signal FMO subjected to filtering is supplied to the mechanical controller 114.

Figure 15:
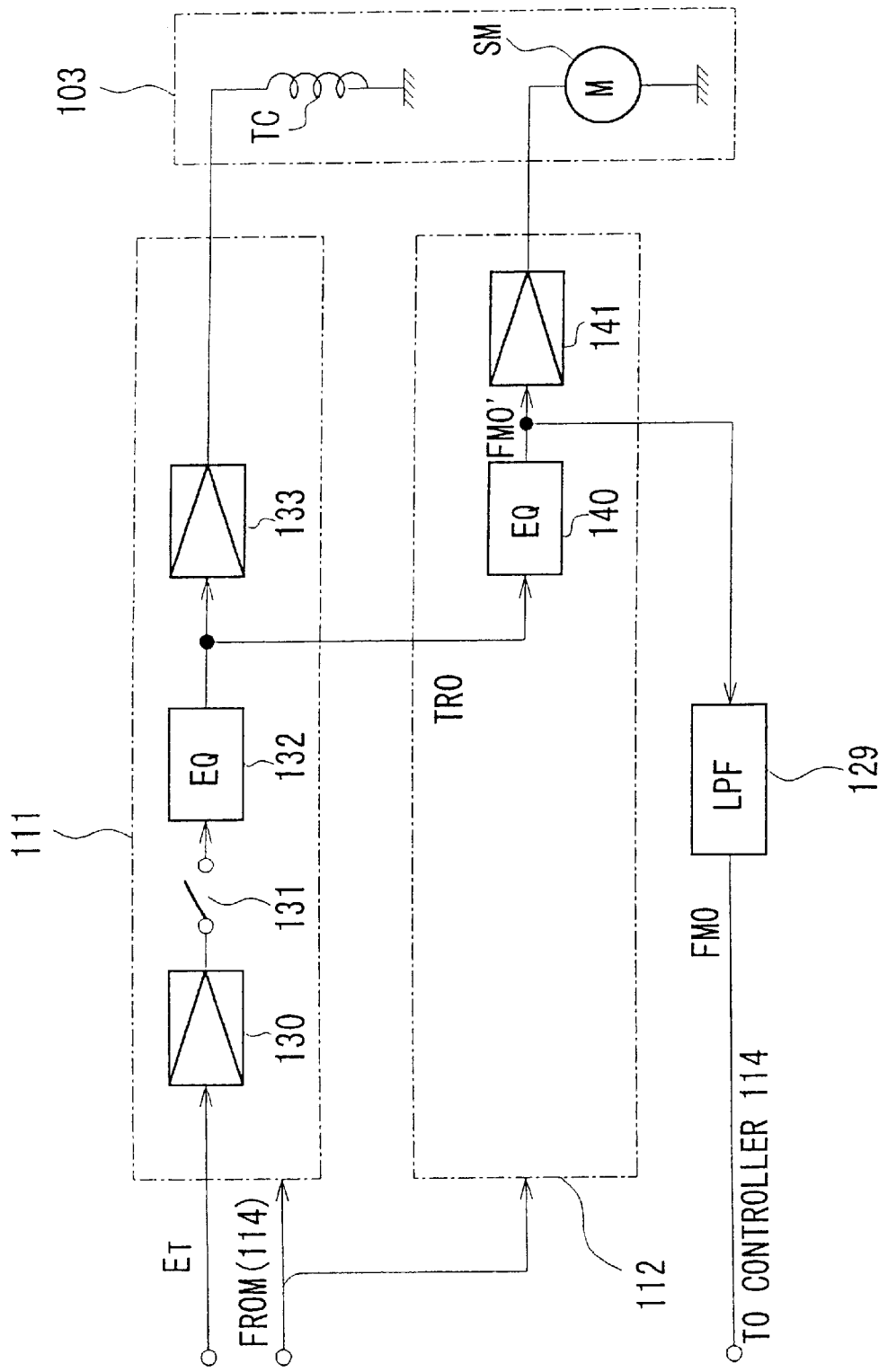
FIG. 15 is a diagram illustrating a further configuration of the principal portion in the drawing showing the configuration of the optical disk device shown in FIG. 13.
Figure 16:
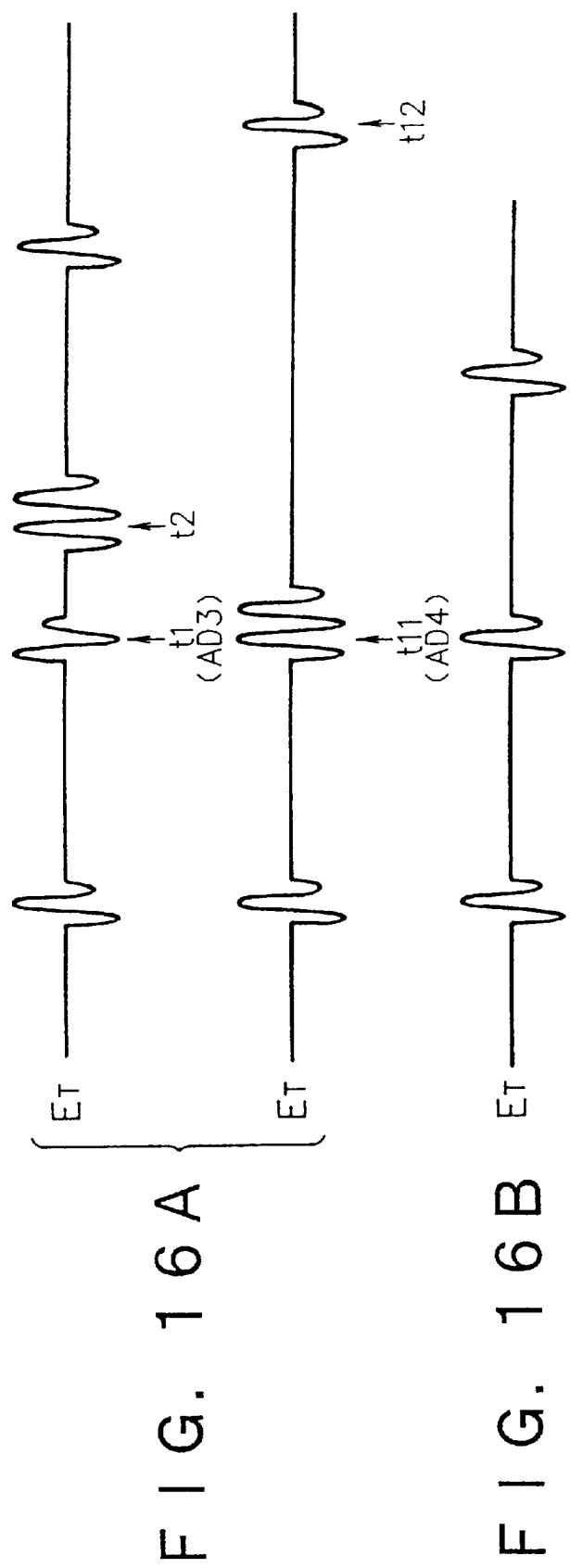
FIG. 16A is a diagram typically showing intervals between track jumps at the time that eccentric and mass eccentric disks are inserted into the CD-ROM drive device according to the embodiment of the present invention.
FIG. 16B is a diagram typically illustrating a tracking error signal for describing intervals between track jumps at the time that the eccentric and mass eccentric disks are inserted into the CD-ROM drive device according to the embodiment of the present invention.
Figure 17:
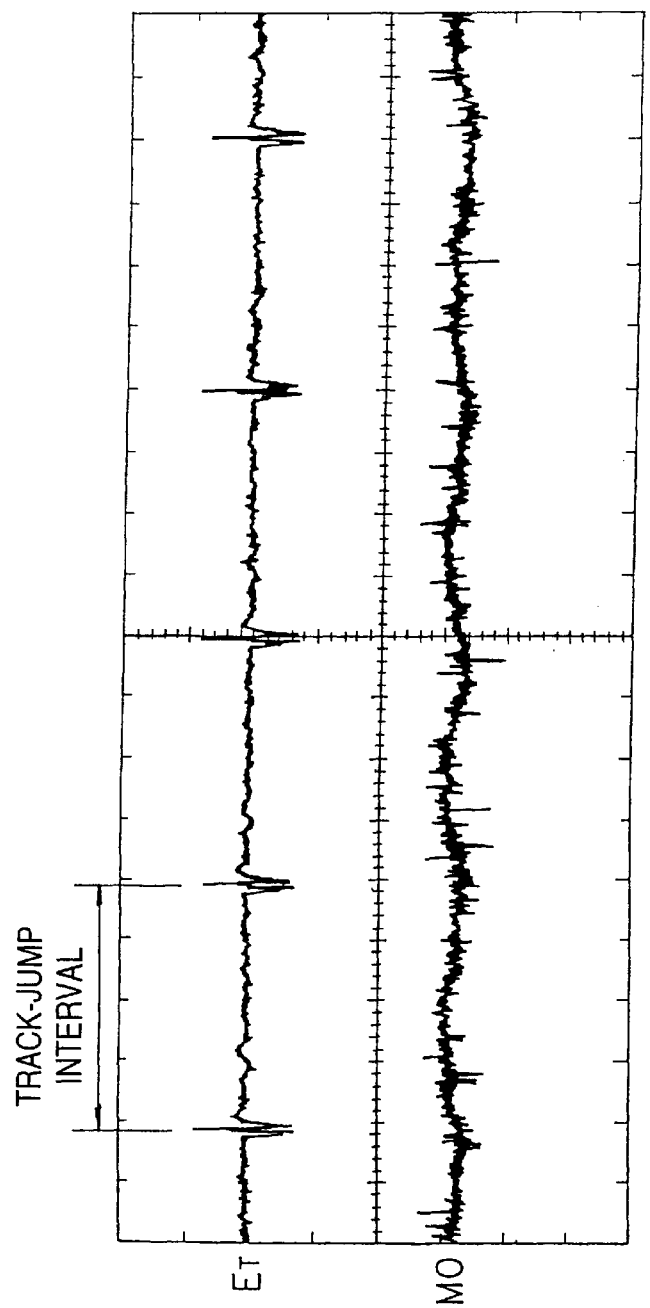
FIG. 17A is a diagram showing a tracking error signal ET at the time that a general disk is inserted into the CD-ROM drive device according to the present invention.
FIG. 17B is a diagram illustrating a control signal DMO of a spindle motor at the time that the general disk is inserted into the CD-ROM drive device according to the embodiment of the present invention.
Figure 18:
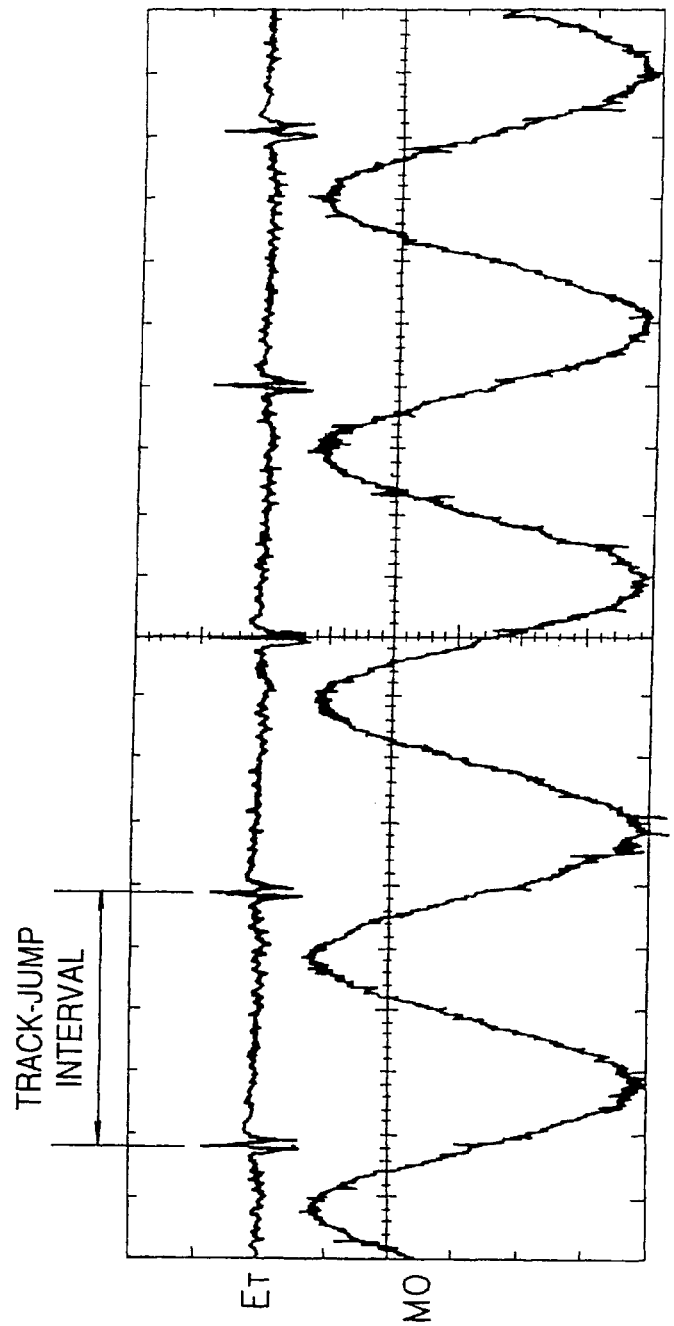
FIG. 18A is a diagram depicting showing a tracking error signal ET at the time that the eccentric disk is inserted into the CD-ROM drive device according to the embodiment of the present invention.
FIG. 18B is a diagram showing a control signal DMO of the spindle motor at the time that the mass eccentric disk is inserted into the CD-ROM drive device according to the embodiment of the present invention.
Figure 19:
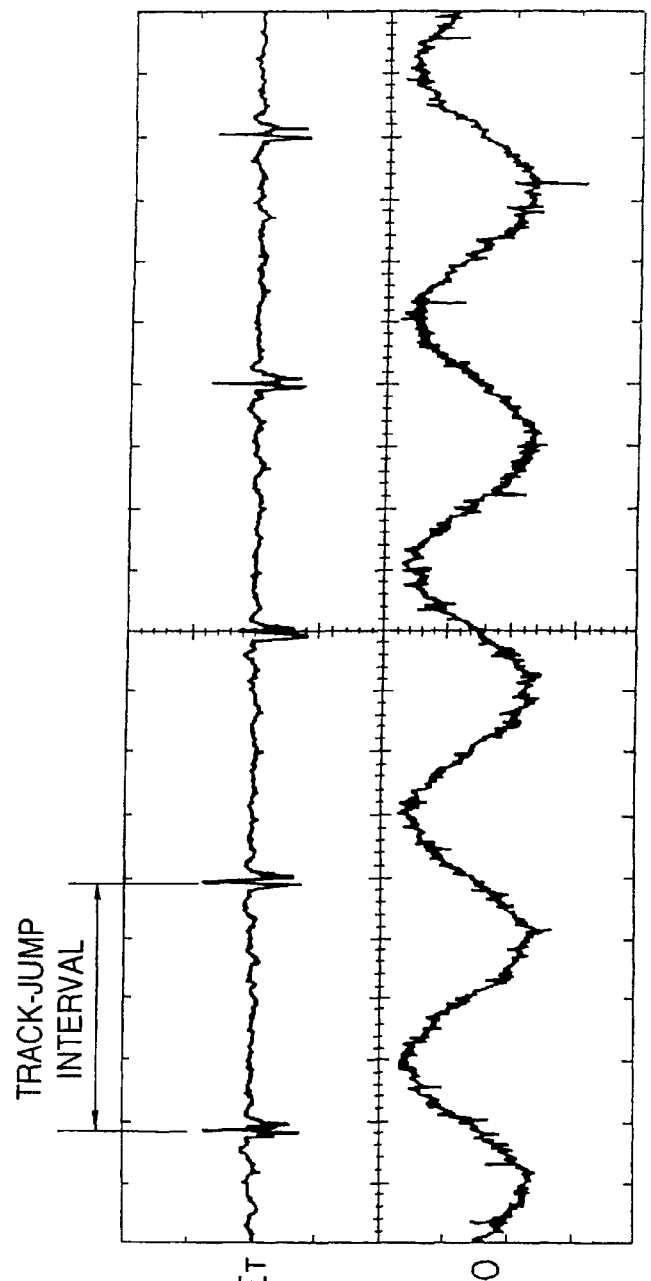
FIG. 19A is a diagram illustrating a tracking error signal at the time that the mass eccentric disk is inserted into the CD-ROM drive device according to the embodiment of the present invention.
FIG. 19B is a diagram showing a control signal DMO of the spindle motor at the time that the mass eccentric disk is inserted into the CD-ROM drive device according to the present invention.

A configuration shown in FIG. 15 is a modification of FIG. 13. An output FMO' of an equalizer amplifier 140 provided within the thread servo control circuit 112 is supplied to the mechanical controller 114 through a low-pass filter 129 as a tracking error signal FMO.

FIGS. 16 through 19 are respectively characteristic diagrams of the tracking error signal FMO subjected to the filtering in FIG. 15. A cut-off frequency of the low-pass filter 129 slightly varies according to a playback speed to be detected. When the playback speed to be detected ranges from a quadruple to an octuple speeds, a range of 100 Hz to 150 Hz is selected as the cut-off frequency of the low-pass filter 129.

A description will next be made of a case in which whether the disk 101 is an eccentric disk or an unbalance disk, can be identified according to an interval of a track jump or an address position where the optical pick-up unit 103 is located after the track jump.

When the disk 101 is an eccentric disk, the optical pick-up unit 103 track-jumps in a holding state. Thereafter, the optical pick-up unit 103 is separated from an address position AD2 of the immediately preceding track with respect to an address position AD1 (see FIG. 3) and is placed in an address position of a track on the inner periphery side or an address position of a track on the outer periphery side. When the disk 101 is an unbalance disk, a self-induced vibration is produced so that the disk 101 and the optical pick-up unit 103 vibrate. Therefore, the optical pick-up unit 103 is not properly placed in the address position AD2 of the immediately preceding track with respect to the address position AD1 in the same manner as the eccentric disk after the optical pick-up unit 103 has track-jumped in the holding state.

Therefore, whether or not the disk 101 is an eccentric disk an unbalance disk, can be identified according to whether the address position where the optical pick-up unit 103 is located after the optical pick-up unit 103 has track-jumped. That is, when the address position of the optical pick-up unit 103 after having track-jumped, is not fixed, it is identified that the disk 101 is either an eccentric disk an unbalance disk. In the present embodiment, this identification is carried out by the mechanical controller 114 based on a subcode address extracted by the CD decoder 106. Further, information about the identification is supplied to the system controller 115.

FIG. 16A typically illustrates a tracking error signal ET at the time that the disk 101 is either an eccentric disk or an unbalance disk. When the optical pick-up unit 103 is placed in an address position AD3 (see FIG. 3) on the outer periphery side of an address positionAD1 at a time t1, the optical pick-up unit 103 is immediately controlled to jump over the inner periphery side by two tracks at a time t2 so as to be placed in an address position AD2. On the other hand, when the optical pick-up unit 103 is placed in an address position AD4 (see FIG. 3) on the farther inner side of the address position AD2, the optical pick-up unit 103 jumps over the track at a time t12 at which the track is reproduced from the address position AD4 to the address position AD2. Thus, when the disk 101 is an eccentric disk or an unbalance disk, a track jump interval changes.

In contrast with FIG. 16A, FIG. 16B typically shows a tracking error signal ET at the time that the disk 101 is not the eccentric disk or the unbalance disk. Since, in this case, the optical pick-up unit 103 is always located in an address position AD2 after it has jumped over the track, a track jump interval becomes constant.

It is therefore possible to identify whether the disk 101 is either an eccentric disk or an unbalance disk, according to whether the track jump interval is constant. That is, when the track jump interval is unfixed, it is identified that the disk 101 is either the eccentric disk or the unbalance disk. In the present embodiment, this identification is performed by the mechanical controller 114 that controls the track jump. Further, information about the identification is supplied to the system controller 115.

A description will next be made of a case in which whether or not the disk 101 is of either an eccentric disk or an unbalance disk can be identified according to the control signal DMO of the spindle motor 102.

FIG. 17B shows a control signal DMO of the spindle motor 102 at the time that the disk 101 is a general disk other than the eccentric disk or the unbalance disk. A level range of the control signal DMO is narrow. FIG. 17A illustrates a tracking error signal ET in that case.

In contrast with FIG. 17B, FIG. 18B shows a control signal DMO of the spindle motor 102 at the time that the disk 101 is an eccentric disk whose eccentricity is 210 μm. A level range of the control signal DMO becomes broad. FIG. 18A shows a tracking error signal ET in that case. FIG. 19B illustrates a control signal DMO of the spindle motor 102 at the time that the disk 101 is of the unbalance disk. A level range of the control signal DMO becomes broad in the same manner as the eccentric disk. FIG. 19A shows a tracking error signal ET in that case.

This is because the spindle motor 102 is not frequently accelerated or decelerated when the general disk is at hold and upon release rotation, whereas when the general disk is either the eccentric disk or the unbalance disk, the spindle motor 102 is not rotated uniformly at the hold and upon the release rotation, so that the spindle motor 102 is frequently accelerated or decelerated.

It is therefore possible to identify whether the disk 101 is either the eccentric disk or the unbalance disk; according to whether or not the level of the control signal DMO of the spindle motor 102 falls within a predetermined range. That is, when the level of the control signal DMO exceeds the predetermined range, the disk 101 is identified as either the eccentric disk or the unbalance disk. In the present embodiment, this identification is performed by the mechanical controller 114 based on the compared output of the aforementioned window comparator 117. Information about the identification is supplied to the system controller 115.

Even if the tracking error signals ET are not different so far in level range from each other as shown in FIGS. 17A through 19A where the disk 101 is of the general disk and either the eccentric disk or the unbalance disk, the control signals DMO of the spindle motor 102 in the respective drawings are so different in level range from one another. Therefore, even when the disk 101 cannot be identified as either the eccentric disk or the unbalance disk according to whether or not the level of the tracking error signal ET falls within the predetermined range, there maybe cases in which the disk 101 can be identified as either the eccentric disk or the unbalance disk according to whether the level of the control signal DMO of the spindle motor 102 falls within the predetermined range.

Conversely, a method of identifying whether or not the disk 101 is either the eccentric disk or the unbalance disk; according to whether or not the level of the control signal DMO of the spindle motor 102 falls within the predetermined range, is not applicable to the spindle motor 102 controlled at a given angular speed.

In the above description, all the methods of (1) through (4) has shown the case in which it is determined whether or not the disk 101 is either the eccentric disk or the unbalance disk. However, the identification may be carried out by only some selected from the methods of (1) through (4). When the identification is not performed by the methods of (2) and (3), it is unnecessary to set the hold state in Step ST2 of a flow chart shown in FIG. 2. That is, the methods of (1) and (4) allow the above identification even in the case of the release state.

In the CD-ROM drive device 100 shown in FIG. 1, when the disk 101 is identified as being neither the eccentric disk nor the unbalance disk upon mounting the disk 101 thereto and the playback speed is set to the sextuple speed, it is determined or identified whether an external vibration or impact of a predetermined level or more exists in a state in which the disk 101 has been rotated after its setting. When it is determined that the external vibration or impact of the predetermined level or more exists, the playback speed is set to the quadruple speed other than the sextuple speed. This is because the reduction of the playback speed from the sextuple speed to the quadruple speed can lessen the influence of the external vibration or impact of the predetermined level or more.

When the external vibration or impact of the predetermined level or more now occurs, the level of the tracking error signal ET exceeds a predetermined range, the interval of the track jump in the hold state is not fixed and the address position of the optical pick-up unit 103 after its track jump is not fixed, in the same manner as when the disk 101 is either the eccentric disk or the unbalance disk. Further, the level of the control signal DMO of the spindle motor 102 exceeds the predetermined range. Thus, the identification as to whether or not the external vibration or impact of the predetermined level or more occurs, is performed in accordance with all the methods of (1) to (4) referred to above or by some selected from the methods.

Further, the identification as to whether or not the external vibration or impact of the predetermined level or more occurs; is performed when the CD-ROM drive device is not supplied with the read command from the host computer and is placed in a standby state and when it is supplied with the read command from the host computer and placed in a playback state.

When the CD-ROM drive device is in the standby state, the identification as to whether or not the external vibration or impact of the predetermined level or more occurs; is performed as a sextuple speed playback hold state at intervals of constant times, for example. The vibration or impact is not necessarily limited to a continuous one. Therefore, even if it is first identified that the external vibration or impact of the predetermined level or more has occurred, and the playback speed is set to the quadruple speed, when it is identified from its subsequent identification that the external vibration or impact of the predetermined level or more does not occur, the playback speed is set to the sextuple speed again. When the playback speed is set to the quadruple speed, the identification as to whether or not the external vibration or impact of the predetermined level or more is not performed in the playback state.

In the present embodiment as described above, since the resonance point f0 of the insulator mounted as a damping material between the base unit and the base unit holder is set so as to sufficiently attenuate the resonance point of the vibration characteristic of the base unit, high performance can be maintained against the external vibration or impact.

In the present embodiment, when it is distinguished upon disk mounting whether or not the disk 101 is either the eccentric disk, or the unbalance disk, and when it is determined that the disk 101 is either the eccentric disk or the unbalance disk, the playback speed is set to the quadruple speed other than the sextuple speed.

Therefore, even if the disk 101 is of the unbalance disk, the generation of the self-induced vibration is controlled upon reproduction. Even if the resonance point f0 of the insulator does not escape from the number of revolutions to be used, as described above, the self-induced vibration can be prevented from being-transmitted to the outside through the insulator. Since the occurrence of the self-induced vibration is controlled even if the disk 101 is of the unbalance disk, the tracking control of the optical pick-up unit 103 becomes easy, so that data can be reproduced from the disk 101 satisfactorily. Since the playback speed is set to the quadruple speed when the disk 101 is of the eccentric disk, the tracking control of the optical pick-up unit 103 becomes easy and the reproduction of data from the disk 101 can be performed satisfactorily.

In the present embodiment, even when it is determined upon mounting of the disk that the disk 101 is neither the eccentric disk nor the unbalance disk and the playback speed is set to the sextuple speed, it is determined whether or not the external vibration or impact of the predetermined level or more has occurred. When it is determined that the external vibration or impact of the predetermined level more has occurred, the playback speed is set to the quadruple speed other than the sextuple speed. Therefore, the influence of the external vibration or impact of the predetermined level on the playback operation can be lessened.

In the aforementioned embodiment, the present invention can be applied to the CD-ROM drive device 100 capable of reproducing data at the standard, quadruple or sextuple speed. However, the present invention can be further applied even to a CD-ROM drive device capable of reproducing data even at speeds such as octuple, dodecuple, . . . speeds. In this case, the determination as to whether or not the aforementioned disk 101 is either the eccentric disk or the unbalance disk, and the determination as to whether the external vibration or impact of the predetermined level occurs, are successively performed from the maximum speed and the set values for the playback speed may be set low successively.

In the CD-ROM drive device capable of data at the standard, quadruple, sextuple and octuple speeds, for example, it is first distinguished upon mounting the disk to the CD-ROM drive device whether or not the disk 101 is neither the eccentric disk nor the unbalance disk in a state in which the data is being reproduced at the octuple speed. When it is determined that the disk 101 is neither the eccentric disk nor the unbalance disk, the playback speed is set to the octuple speed. On the other hand, when the disk 101 is determined to be either the eccentric disk or the unbalance disk, it is next determined whether or not the disk 101 is either the eccentric disk or the unbalance disk in a state in which the data is being reproduced at the sextuple speed. When it is determined that the disk 101 is neither the eccentric disk nor the unbalance disk, the playback speed is set to the sextuple speed. On the other hand, when it is determined that the disk 101 is either the eccentric disk or the unbalance disk, the playback speed is set to the quadruple speed.

The playback speed may be successively set to a high playback speed as in the case of the quadruple speed, sextuple speed, octuple speed, tenfold speed, and so on contrary perfectly to the above description.

The aforementioned embodiment has described the utilization of the tracking error signal ET. However, even if the focus error signal EF is used, it can be distinguished in the same manner as described above whether or not the disk 101 is either the eccentric disk or the unbalance disk and whether the external vibration or impact of the predetermined level or more occurs.

In the above-described embodiment, the present invention is applied to the CD-ROM drive device 100. It is however needless to say that the present invention can be applied to an optical disk drive device capable of recording and reproducing data, such as a CD-R drive device, a magneto-optical disk drive device, a digital video disk drive device, and a mini-disk drive device, and even to a magnetic disk drive device such as a hard disk in the same manner as described above.

According to the present invention, when it is determined that the disk is either the eccentric disk or the unbalance disk in a state in which a disk-shaped recording medium is being rotated at a predetermined speed, its rotational speed is lowered. Alternatively, when it is determined that the disk is neither the eccentric disk nor the unbalance disk in a state in which the disk-shaped recording medium is being rotated, its rotational speed is increased.

Therefore, when the disk corresponds to the unbalance disk, the generation of the self-induced vibration can be restrained upon recording and reproduction and the vibration transmitted to the outside can be lessened. Further, the recording and reproducing operations can be performed satisfactorily. The resonance point of the damping material mounted between the base unit and the base unit holder can be set so as to sufficiently attenuate the resonance point of the vibration characteristic of the base unit and so as not to escape from the frequency based on the number of revolutions to be used, thus it is possible to maintain high performance against the external vibration or impact.

When it is determined in a state in which the disk-shaped recording medium is being rotated at the predetermined speed, whether or not the external vibration or impact of the predetermined level or more has occurred, the rotational speed of the disk-shaped recording medium is reduced. It is therefore possible to lessen the influence of the external vibration or impact predetermined level or higher on the recording and reproducing operations.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplation that the appended claims will cover any such modifications or embodiments as fall within the true scope of the invention.

What is claimed is:

1. A disk drive device having a base unit provided with a disk rotating unit having a spindle motor for rotating a disk-shaped recording medium and with a head for accessing data in the disk-shaped recording medium, said base unit being mounted to a base unit holder through a damping member, comprising:

rotational speed control means for controlling the rotation of said spindle motor to thereby control a rotational speed of said disk-shaped recording medium to a set value;

disk distinguishing means for determining, in a state in which said disk-shaped recording medium is being rotated, whether said disk-shaped recording medium is an eccentric disk or an unbalance disk; and rotational speed setting means for, when said disk distinguishing means has determined said disk-shaped recording medium as the eccentric disk or the unbalance disk in a state in which said disk-shaped recording medium is being rotated at a first rotational speed, changing said set value to a second rotational speed slower than the first rotational speed;

wherein said disk distinguishing means includes:

hold means for controlling said head so that said head track-jumps over an address position of the immediately preceding track each time said head comes to a predetermined address position of the track on said disk-shaped recording medium; and track-jump interval determining means for determining whether the interval of said track jump is constant, and signal level determining means for determining whether the level of a spindle motor control signal for controlling the rotation of said spindle motor falls within a predetermined range;

said disk distinguishing means distinguishes based on the results of determination by said track-jump interval determining means and said signal level determining means whether said disk-shaped recording medium is either an eccentric disk or an unbalance disk.

2. The device of claim 1 wherein a resonance point of said damping member is set so as to sufficiently attenuate a resonance point of a vibration characteristic of said base unit.

3. The device of claim 2 wherein said disk distinguishing means includes filtering means and said spindle motor control signal is a signal obtained by filtering the tracking error signal indicative of the position displacement of said head relative to the track on said disk-shaped recording medium by said filtering means.

4. The device of claim 3 wherein said filtering means is a low-pass filter supplied with the tracking error signal.

5. The device of claim 4 wherein said tracking error signal is supplied to an equalizer amplifier provided within a tracking servo control circuit from which its output is supplied to said low-pass filter.

6. The device of claim 4 wherein said tracking error signal is supplied to equalizer amplifiers respectively provided within a tracking servo control circuit and a thread servo control circuit and an output produced from the equalizer amplifier of said thread servo control circuit is supplied to said low-pass filter.

7. The device of claim 1 wherein said disk distinguishing means includes filtering means and said spindle motor control signal is a signal obtained by filtering the tracking error signal indicative of the position displacement of said head relative to the track on said disk-shaped recording medium by said filtering means.

8. The device of claim 7 wherein said filtering means is a low-pass filter supplied with the tracking error signal.

9. The device of claim 8 wherein said tracking error signal is supplied to an equalizer amplifier provided within a tracking servo control circuit from which its output is supplied to said low-pass filter.

10. The device of claim 8 wherein said tracking error signal is supplied to equalizer amplifiers respectively provided within a tracking servo control circuit and a thread servo control circuit and an output produced from the equalizer amplifier of said thread servo control circuit is supplied to said low-pass filter.

11. A disk drive device having a disk rotating unit having a spindle motor for rotating a disk-shaped recording medium, and a head for accessing data in the disk-shaped recording medium, comprising:

rotational speed control means for controlling the rotation of said spindle motor to thereby control a rotational speed of said disk-shaped recording medium to a set value;

vibration and impact distinguishing means for distinguishing whether an external vibration or impact of a predetermined level or more occurs in a state in which said disk-shaped recording medium is being rotated; and rotational speed setting means for, when said vibration and impact distinguishing means has recognized the occurrence of the external vibration or impact of the predetermined level or more in a state in which the rotational speed of said disk-shaped recording medium is at a first rotational speed, changing said set value to a second rotational speed slower than the first rotational speed;

wherein said vibration and impact distinguishing means includes:

hold means for controlling said head so that said head track-jumps over an address position of the immediately preceding track each time said head comes to a predetermined address position of the track on said disk-shaped recording medium; and track-jump interval determining means for determining whether the interval of said track jump is constant;

said vibration and impact distinguishing means distinguishes based on the result of determination by said track-jump interval determining means whether the external vibration or impact of the predetermined level or more occurs.

12. The device of claim 11 wherein said disk rotating unit and said head are fixed to a base unit and said base unit is mounted to a base unit holder through a damping member.

13. A disk drive device having a disk rotating unit having a spindle motor for rotating a disk-shaped recording medium, and a head for accessing data in the disk-shaped recording medium, comprising:

rotational speed control means for controlling the rotation of said spindle motor to thereby control a rotational speed of said disk-shaped recording medium to a set value;

vibration and impact distinguishing means for distinguishing whether an external vibration or impact of a predetermined level or more occurs in a state in which said disk-shaped recording medium is being rotated; and rotational speed setting means for, when said vibration and impact distinguishing means has recognized the occurrence of the external vibration or impact of the predetermined level or more in a state in which the rotational speed of said disk-shaped recording medium is at a first rotational speed, changing said set value to a second rotational speed slower than the first rotational speed;

wherein said vibration and impact distinguishing means includes:

hold means for controlling said head so that said head track-jumps over an address position of the immediately preceding track each time said head comes to a predetermined address position of the track on said disk-shaped recording medium; and address position determining means for determining whether the address position where said head is located after having track-jumped, is constant;

said vibration and impact distinguishing means distinguishes based on the result of determination by said address position determining means whether the external vibration or impact of the predetermined level or more occurs.

14. The device of claim 13 wherein said disk rotating unit and said head are fixed to a base unit and said base unit is mounted to a base unit holder through a damping member.

15. A method of setting a rotational speed of a disk drive device having a disk rotating unit having a spindle motor for rotating a disk-shaped recording medium and a head for accessing data in the disk-shaped recording medium, comprising the steps of:

a first step for controlling said disk rotating unit so as to rotate said disk-shaped recording medium at a first rotational speed;

a second step for distinguishing whether an external vibration or impact of a predetermined level or more occur in a state in which said disk-shaped recording medium is being rotated at the first rotational speed; and a third step for setting the rotational speed of said disk-shaped recording medium to a second rotational speed slower than the first rotational speed when the external vibration or impact of the predetermined level or more occurs;

wherein said second step sets said head to a hold state for controlling said head so that said head track-jumps over an address position of the immediately preceding track each time said head comes to a predetermined address position of the track on said disk-shaped recording medium, and distinguishes according to whether the interval of said track jump is constant, whether the external vibration or impact of the predetermined level or more occur.

16. A method of setting a rotational speed of a disk drive device having a disk rotating unit having a spindle motor for rotating a disk-shaped recording medium and a head for accessing data in the disk-shaped recording medium, comprising the steps of:

a first step for controlling said disk rotating unit so as to rotate said disk-shaped recording medium at a first rotational speed;

a second step for distinguishing whether an external vibration or impact of a predetermined level or more occur in a state in which said disk-shaped recording medium is being rotated at the first rotational speed; and a third step for setting the rotational speed of said disk-shaped recording medium to a second rotational speed slower than the first rotational speed when the external vibration or impact of the predetermined level or more occurs;

wherein said second step sets said head to a hold state for controlling said head so that said head track-jumps over an address position of the immediately preceding track each time said head comes to a predetermined address position of the track on said disk-shaped recording medium, and distinguishes according to whether an address position where sad head is located, is constant after having track-jumped, whether the external vibration or impact of the predetermined level or more occurs.

* * * * *

UNITED STATES PATENT AND TRADEMARK OFFICE
CERTIFICATE OF CORRECTION

PATENT NO. : 6,317,399 B1
DATED : November 13, 2001
INVENTOR(S) : Hisao Ohtani et al.

It is certified that error appears in the above-identified patent and that said Letters Patent is hereby corrected as shown below:

<u>Column 5,</u>
Line 23, change "or" to -- of --.

<u>Column 16,</u>
Line 50, change "contemplation" to -- contemplated --.

<u>Column 20,</u>
Line 29, change "sad" to -- said --.

Signed and Sealed this

Twenty-sixth Day of March, 2002

*Attest:*

JAMES E. ROGAN
*Attesting Officer*     *Director of the United States Patent and Trademark Office*